(12) United States Patent
Pilliere

(10) Patent No.: US 11,796,492 B2
(45) Date of Patent: Oct. 24, 2023

(54) APPARATUSES AND METHODS FOR COMBINED SIMULTANEOUS ANALYSES OF MATERIALS

(71) Applicant: INEL S.A.S., Artenay (FR)

(72) Inventor: Henry Pilliere, Artenay (FR)

(73) Assignee: INEL S.A.S., Artenay (FR)

( * ) Notice: Subject to any disclaimer, the term of this patent is extended or adjusted under 35 U.S.C. 154(b) by 72 days.

(21) Appl. No.: 17/550,440

(22) Filed: Dec. 14, 2021

(65) Prior Publication Data

US 2022/0205935 A1  Jun. 30, 2022

(30) Foreign Application Priority Data

Dec. 24, 2020  (EP) ..................................... 20306695

(51) Int. Cl.
*G01N 23/2206* (2018.01)
*G01N 23/20025* (2018.01)
(Continued)

(52) U.S. Cl.
CPC ....... *G01N 23/2206* (2013.01); *G01N 23/207* (2013.01); *G01N 23/20025* (2013.01); *G01N 23/2076* (2013.01); *G01N 23/223* (2013.01); *G01N 23/2204* (2013.01); *G01N 23/2209* (2018.02); *G01N 21/17* (2013.01); *G01N 21/63* (2013.01); *G01N 2223/056* (2013.01); *G01N 2223/071* (2013.01); *G01N 2223/076* (2013.01);
(Continued)

(58) Field of Classification Search
None
See application file for complete search history.

(56) References Cited

U.S. PATENT DOCUMENTS 3,344,274 A   9/1967  Ashby et al.
4,263,510 A   4/1981  Ciccarelli et al.
(Continued)

FOREIGN PATENT DOCUMENTS

DE   10250997 A1   3/2004
EP      0183043     6/1986
(Continued)

OTHER PUBLICATIONS

EP20306695.6, Extended European Search Report, dated Jun. 28, 2021, 9 pages.

*Primary Examiner* — Thomas R Artman
(74) *Attorney, Agent, or Firm* — Thomas F. Cooney

(57) ABSTRACT

An analysis apparatus comprises: a moveable stage assembly; a sample holder on a top surface of the stage assembly; a first photon source and a first photon detector or detector array, the first photon source being configured to emit a first beam of photons that intercepts the surface of a sample at a first location on the sample and the first photon detector or detector array being configured to detect photons that are emitted from the first location; and a second photon source and a second photon detector or detector array, the second photon source being configured to emit a second beam of photons that intercepts the surface of the sample at a second location on the sample, the second location being spaced apart from the first location, and the second photon detector or detector array being configured to detect photons that are emitted from the second location.

19 Claims, 11 Drawing Sheets

(51) Int. Cl.
*G01N 23/207* (2018.01)
*G01N 23/2204* (2018.01)
*G01N 23/2209* (2018.01)
*G01N 23/223* (2006.01)
*G01N 21/17* (2006.01)
*G01N 21/63* (2006.01)

(52) U.S. Cl.
CPC ........ *G01N 2223/1016* (2013.01); *G01N 2223/304* (2013.01); *G01N 2223/306* (2013.01); *G01N 2223/307* (2013.01); *G01N 2223/309* (2013.01); *G01N 2223/314* (2013.01); *G01N 2223/32* (2013.01); *G01N 2223/321* (2013.01); *G01N 2223/3306* (2013.01); *G01N 2223/3308* (2013.01); *G01N 2223/501* (2013.01); *G01N 2223/509* (2013.01); *G01N 2223/605* (2013.01); *G01N 2223/616* (2013.01)

(56) References Cited

U.S. PATENT DOCUMENTS

| | | | |
|---|---|---|---|
| 5,745,543 A | 4/1998 | De Boxx et al. | |
| 6,798,863 B2 | 12/2004 | Sato | |
| 6,829,327 B1 | 12/2004 | Chen | |
| 7,113,265 B1 | 9/2006 | Sarrazin et al. | |
| 7,269,245 B2* | 9/2007 | He | G01N 23/20 378/81 |
| 7,440,541 B2* | 10/2008 | Hubbard-Nelson | G01N 23/223 378/45 |
| 7,983,386 B2* | 7/2011 | Yellepeddi | G01N 23/223 378/70 |
| 8,903,040 B2* | 12/2014 | Maeyama | G01N 23/207 378/45 |
| 8,982,338 B2* | 3/2015 | Hamilton | G01N 21/85 356/72 |
| 9,031,187 B2* | 5/2015 | Yellepeddi | G01N 23/223 378/81 |
| 9,383,324 B2 | 7/2016 | Feser et al. | |
| 9,449,781 B2 | 9/2016 | Yun et al. | |
| 9,739,729 B2 | 8/2017 | Feser et al. | |
| 9,739,730 B2 | 8/2017 | Hegeman et al. | |
| 9,778,213 B2* | 10/2017 | Bakeman | G01N 23/223 |
| 9,823,203 B2 | 11/2017 | Yun et al. | |
| 10,473,598 B2* | 11/2019 | Ogata | G01N 23/2204 |
| 10,677,697 B2 | 6/2020 | Uemoto et al. | |
| 2006/0023837 A1* | 2/2006 | He | G01N 23/227 378/70 |
| 2008/0159474 A1* | 7/2008 | Hubbard-Nelson | G01N 33/287 378/45 |
| 2010/0111251 A1* | 5/2010 | Yellepeddi | G01N 23/223 378/73 |
| 2011/0007869 A1* | 1/2011 | Gendreau | G01N 23/20 378/46 |
| 2012/0288058 A1* | 11/2012 | Maeyama | G01N 23/2206 378/46 |
| 2012/0294418 A1* | 11/2012 | Yellepeddi | G01N 23/207 378/44 |
| 2013/0321793 A1* | 12/2013 | Hamilton | G01N 21/65 356/72 |
| 2015/0002680 A1 | 1/2015 | Sarrazin et al. | |
| 2015/0051877 A1* | 2/2015 | Bakeman | G01N 23/223 703/1 |
| 2016/0069826 A1 | 3/2016 | Williams | |
| 2016/0123909 A1 | 5/2016 | Wormington et al. | |
| 2017/0234814 A1* | 8/2017 | Ogata | G01N 23/2206 378/44 |
| 2019/0145915 A1 | 5/2019 | Kimijima et al. | |
| 2020/0182809 A1 | 6/2020 | Storer et al. | |
| 2020/0225253 A1 | 7/2020 | Wilt et al. | |
| 2022/0205935 A1* | 6/2022 | Pilliere | G01N 23/2209 |
| 2022/0206024 A1* | 6/2022 | El Mendili | G01N 35/00871 |

FOREIGN PATENT DOCUMENTS

| | | | |
|---|---|---|---|
| EP | 1632770 B1 | 6/2008 | |
| EP | 1650558 B1 | 9/2010 | |
| EP | 2856125 A1 | 4/2015 | |
| EP | 2126553 B1 | 4/2016 | |
| EP | 2513641 B1 * | 4/2019 | ........ G01N 23/207 |
| JP | S61217748 A | 9/1986 | |
| JP | S61259151 A * | 11/1986 | |
| JP | S63134942 A * | 6/1988 | |
| KR | 20150145861 A | 12/2015 | |
| NL | 2020694 | 10/2019 | |
| WO | WO-20130180922 | 12/2013 | |
| WO | WO-2016028535 | 2/2016 | |

* cited by examiner

APPARATUSES AND METHODS FOR COMBINED SIMULTANEOUS ANALYSES OF MATERIALS

CROSS-REFERENCE TO RELATED APPLICATIONS

The present application claims, under 35 U.S.C. § 119(a), priority to and the benefit of the filing date of European Application EP20306695.6, titled "Apparatuses and Methods for Combined Simultaneous Analyses of Materials", which was filed on Dec. 24, 2020, the disclosure of which is incorporated herein by reference in its entirety. This application is also related to co-assigned U.S. application Ser. No. 17/335,339 titled "Methods and System for Materials Characterization Using Multiple Instruments and Data Fusion", which was filed on Jun. 1, 2021.

FIELD OF THE INVENTION

The present invention relates to apparatuses and methods for combined chemical and, optionally, physical analyses, at a plurality of locations on a sample using multiple simultaneous analytical techniques.

BACKGROUND OF THE INVENTION

X-ray diffraction (XRD) and X-ray fluorescence are two powerful and complementary techniques for analyzing the crystalline phase composition and chemical composition, respectively, of samples. X-ray diffractometry identifies and quantifies the crystalline phases that make up a sample. Several detector arrangements exist including arrangements which continuously rotate a crystalline sample as well as a detector in order to produce a scan of the intensities of various diffraction peaks (e.g., "reflections"), the diffraction angles of which relate to the spacings between various crystallographic planes of crystalline phases within the sample. Other arrangements employ an array of detectors disposed at various respective angles relative to a static sample surface. Since the crystal structures of most common non-organic crystalline phases have been measured, a comparison between observed and tabulated spacings can, in many cases, permit identification of the crystalline phases that are illuminated by the incident X-ray beam. Further, X-ray diffraction studies can distinguish cryptocrystalline phases from amorphous or glassy materials in many circumstances.

X-ray fluorescence spectroscopy makes use of the fact that, under the atomic excitation effect of an incident energy beam (such as an electron beam or certain wavelengths of an X-ray beam), the atoms of a material will re-emit a characteristic radiation coming from the characteristic lines of the atoms themselves (called fluorescence). The condition is that the primary incident radiation must be more energetic than the characteristic lines of the atoms. Thus, the primary source of X-rays generally comes from an X-ray tube having a target anode of either tungsten, rhodium or molybdenum. The detection of emitted fluorescence radiation may be carried out either by a goniometric assembly with an analyzer crystal and a point gas detector (so-called wavelength-dispersive X-ray fluorescence or WDXRF), or by using a detector allowing good energy discrimination (so-called energy-dispersive X-ray fluorescence or EDXRF). The second assembly is more compact and consists of static components and is therefore more suitable for field use.

Frequently, X-ray fluorescence, X-ray diffraction and other analysis apparatuses of various types are employed in pure and applied research laboratory environments. Other situations arise, however, in which such analyses apparatuses are employed in commercial manufacturing or commercial field exploration activities wherein a continuous or semi-continuous stream of material is provided for analysis. One example of such situation is a manufacturing production line in which manufactured parts or finished articles are continuously presented, such as by a conveyer belt system, for analysis in rapid succession. An analysis station may be set up along the conveyer belt system in a fashion so as to obtain a measurement of one or more properties of each article or part as it passes the analysis station. Based on the measurement(s), a pass-versus-fail test and determination are automatically carried out for each passing article or part. The parts or articles that fail are automatically ejected from the production line at a point downstream from the test station. Such an environment requires the analysis apparatus to operate with high efficiency.

Another analysis situation that requires highly efficient analyses is characterization of exploratory geological drill core samples. One pilot project in this field that has been active since 2016 is the "sonic drilling coupled with automated mineralogy and chemistry" project (SOLSA), which has been carried out by a consortium of nine European-based industrial and academic partners, with partial funding provided by the European Union's Horizon 2020 research and innovation program under grant agreement No 689868. The stated goals of SOLSA are to investigate the combination of exploration, database management, instrumentation and software development, drilling rigs, analytical prototypes and marketing strategies. SOLSA is the first automated expert system for on-site cores analysis. The project includes development of new or improved highly efficient and cost-effective, sustainable exploration technologies. Accordingly, the SOLSA project includes: (1) integrated drilling optimized to operate in the difficult lateritic environment with the challenge of a mixture of hard and soft rocks, extensible also to other ore types; and (2) fully automated scanner and phase identification software, usable as well in other sectors.

FIG. 1 is a schematic depiction of a potential outcome of SOLSA—a system 100 for real-time on-site compositional and phase characterization of samples that are provided as a continuous or nearly-continuous flux of samples. Although the illustrated exemplary system 100 that is shown in FIG. 1 is specifically directed to analysis of geological core samples, a similar system may be employed for the purpose of quality control monitoring and/or process monitoring of either raw material, intermediate product or finished product moving through a manufacturing process. In the illustrated system 100, a linear conveyance apparatus, such as a conveyer belt 101, continuously moves geological cores 102, 103 past analysis apparatuses 105a-105e, each of which obtain data in a non-contact and generally non-destructive fashion. In the illustrated system, the analytical apparatuses 105a, 105b, 105c, 105d and 105e obtain data relating to core sections as they move past positions 1, 2, 3, 4 and 5, respectively. Although five such analysis apparatuses are depicted in FIG. 1, the present invention is not specifically limited to any particular number of analysis apparatuses. The cores may be supported on or within one or more carriages 104 as they move past the positions 1-5.

Since the analysis apparatuses 105a-105e do not make contact with the cores 102, 103, each such analytical apparatus operates by detecting particles that originate at the samples and that propagate across a gap between the sample and the apparatus. Thus, each of the analysis apparatuses 105a-105e is associated with a respective particle propagation zone (e.g., particle propagation zones 107a-107e) within which particles propagate from the core sample to the respective analysis apparatus. If one or more of the analysis apparatuses is a radioactive decay detector, then the detected particles may be alpha particles or beta particles. However, in most cases, the detected particles will be photons. Accordingly, photon detection is assumed in the remainder of this document and the particle propagation zones 107a-107e are hereinafter referred to as photon propagation zones. In some instances, the photon propagation zones may also be zones of illumination within which photons are caused to propagate from the analysis apparatus to the sample.

Optionally, one or more additional analytical apparatuses 105f, 105g may be provided in a mobile or temporary field laboratory 111 in order to provide the capability of performing additional analytical tests on core slices or other core samples 102s obtained from the cores 102, 103. The core slices or samples 102s may be taken from the cores at periodic time or core-length intervals and/or may be taken from selected portions of the cores based on data obtained from one or of the analysis apparatuses 105a-105e. Preferably, the mobile field laboratory comprises computer hardware 109, including computer memory storage and data processing capability, that is in communication with the analysis apparatuses 105a-105e and, if present, analysis apparatuses 105f-105g, by means of data communication lines 113.

Preferably, the set of analysis apparatuses includes a profilometer (e.g., analytical apparatus 105a) that measures and records the surface topography of each passing core section as well as a visible-light camera (e.g., analytical apparatus 105b) that creates a visual record of each such section. The photon propagation zone 107a corresponding to the profilometer 105a will generally include an outgoing beam or beams that illuminate the core surface as well as a set of returning rays comprising light that is reflected or scattered from the core surface. The photon propagation zone 107b corresponding to the visible-light camera 105b will comprise light reflected or scattered from the core surface and may also comprise illumination rays such as, for example, illumination rays from a flashlamp.

The profilometer and/or camera may create a permanent record of the physical configuration of the cores at the time of analyses that other measurements (e.g., measurements made by apparatuses 105b-105e and, if present, apparatuses 105f-105g) may be referenced against. Further, if geological bedding is observed in the core sections, the profilometer and camera may provide a record of the bedding orientation (e.g., geological strike and dip), provided that the orientation of the cores relative to map coordinates is preserved at the time of core extraction. The derived bedding orientation may then be used to extrapolate any interesting compositional, mineralogical, or other information generated by the set of analysis apparatuses 105a-105e and, if present, 105f-105f to other locations remote from the core extraction site.

Each one of the remaining analytical apparatuses (e.g., apparatuses 105c-105e and 105f-105g in the example system 100) is used to acquire specific information that may pertain to either chemical composition or mineralogical phase composition. The number and types of apparatuses that are employed are at the discretion of the user. Without limitation, the set of analysis apparatuses may include: a visible and near-infrared (VNIR) camera and/or spectrometer, possibly including an illumination source, that detects light wavelengths between approximately 400 and 1100 nanometers (nm); a short wave infrared (SWIR) camera and/or spectrometer, possibly including an illumination source, that detects light wavelengths between approximately 1400 and 3000 nanometers; a Raman spectrometer and/or probe; a laser-induced breakdown spectroscopy (LIBS) spectrometer and/or probe; an X-ray diffraction (XRD) spectrometer; and an X-ray fluorescence spectrometer.

During real-time drill core characterization, it may be sometimes necessary to extract slices or pieces 102s of the core for additional detailed analyses that are carried out within the temporary field laboratory 111. Because the analytical apparatuses 105a-105e only obtain information from the irregular exterior surface of the core, such additional detailed analyses may be necessary to prepare a flat surface for controlled analysis and to further characterize the bulk sample. The required sample preparation and additional analyses may be undertaken within the controlled environment of the field laboratory 111. It is desirable for the field laboratory to include both an X-ray diffraction apparatus and an X-ray fluorescence spectrometer because of the known complementarity of these two techniques.

U.S. Pat. No. 10,473,598 describes an X-ray thin film inspection device that relates to an X-ray thin film inspection device suitable for use in a semiconductor manufacturing field, etc., such as a technical field for manufacturing an element having a multilayer structure in which many thin films are laminated on a substrate. The X-ray thin film inspection device includes an X-ray irradiation unit installed on a first rotation arm, an X-ray detector installed on a second rotation arm, and a fluorescence X-ray detector for detecting fluorescence X-rays generated from an inspection target upon irradiation of X-rays. The X-ray irradiation unit includes an X-ray optical element comprising a confocal mirror for receiving X-rays radiated from an X-ray tube. The X-ray optical element reflects plural focused X-ray beams monochromatized at a specific wavelength and focuses the plural focused X-ray beams to a preset focal point. The X-ray irradiation unit further comprises a slit mechanism for passing therethrough any number of focused X-ray beams out of the plural focused X-ray beams reflected from the X-ray optical element.

Chinese patent application publication CN107228871 describes a portable X-ray analysis device which comprises an X-ray generator, an X-ray fluorescence analysis unit, an X-ray diffraction analysis unit and a spectral analysis module, wherein the X-ray fluorescence analysis unit comprises a fluorescence sample stage used for placing a fluorescence sample. The fluorescence sample stage comprises a first base arranged horizontally and provided with a notch, and an inclined sample loading stage arranged in the notch in a slideable manner and provided with an inclined surface. A placement groove is formed in the inclined surface in a concave manner. A first object bearing sheet for bearing the fluorescence sample is placed in the placement groove. A first through hole is located in the placement groove and penetrates through the inclined sample loading stage. The X-ray diffraction analysis unit comprises an X-ray collimation adjustment module located under the first through hole, a diffraction sample stage connected with the lower end of the X-ray collimation adjustment module, and a CCD detection module located below the diffraction sample stage and connected with the spectral analysis module. The inventors describe benefits of shortened analysis time, smallness of size, and reduced weight and cost such that the device may be conveniently operated in a field environment.

US Patent Application Publication No. US20110007869A1 describes an X-ray diffraction and X-ray fluorescence instrument for analyzing samples having no sample preparation. The instrument includes an X-ray source configured to output a collimated X-ray beam comprising a continuum spectrum of X-rays to a predetermined coordinate and a photon-counting X-ray imaging spectrometer disposed to receive X-rays output from an unprepared sample disposed at the predetermined coordinate upon exposure of the unprepared sample to the collimated X-ray beam. The X-ray source and the photon-counting X-ray imaging spectrometer are arranged in a reflection geometry relative to the predetermined coordinate.

European patent EP1650558B1 describes an energy dispersion type X-ray diffraction/spectral device which moves a white X-ray generating means and an X-ray detecting means to a first position and a second position which are separate from each other, uses intensities of X-rays detected for each level of energy by said X-ray detecting means at the respective positions as first data and second data, obtains third data regarding diffracted X-rays from the difference between said first data and said second data and obtains data regarding fluorescent X-rays from the difference between the first or second data and third data.

German patent application publication DE10250997A1 describes a mobile X-ray test unit for use with thick and complicated structures that resolves fluorescence, first and higher order diffraction to give surface and depth chemical composition profiles. The test unit resolves the secondary radiation into a fluorescence and first order diffraction line spectrum and a higher order diffraction depth profile using a mobile source and detector with a constant angle between beams that are pivoted and rotated about a test sample.

U.S. Pat. No. 6,798,863 describes a combined X-ray analysis apparatus having two functions, a function for X-ray fluorescence analysis and a function for X-ray diffraction. An X-ray tube target structure that is a Cu layer on an Mo layer is adopted. When excitation is performed using a low accelerating voltage, this is made monochromatic by using a Cu filter to filter the Cu—K lines and the continuous X-rays generated, with the radiation quality (Cu—K lines) thus generated then being utilized in X-ray diffraction. When excitation is performed using a high accelerating voltage, Cu—K lines of the Cu—K lines, Mo—K lines and continuous X-rays thus generated are blocked by absorption using an Mo or Zr filter, with the Mo—K lines and continuous X-rays thus obtained being utilized in X-ray fluorescence analysis.

U.S. Pat. No. 5,745,543 describes an apparatus for the examination of materials by simultaneous X-ray diffraction and X-ray fluorescence, the apparatus comprising: a sample location for accommodating a sample of a material to be examined, an X-ray source for irradiating the sample holder by means of polychromatic X-rays, a collimator which is arranged to transmit at least one X-ray beam of line-shaped cross-section and is positioned between the X-ray source and the sample holder, a diffraction unit which comprises a detection device for the detection of X-rays diffracted by the sample, and a fluorescence unit which comprises a detection device with an analysis crystal for the detection of fluorescent radiation generated in the sample. The X-ray source is arranged to produce a line-shaped X-ray focus. The collimator comprises only one aperture which extends parallel to the line-shaped X-ray focus. The detection device of the fluorescence unit comprises a location-sensitive detection array for the detection of X-rays reflected by the analysis crystal.

US patent application publication US20160123909A1 describes a method for X-ray measurement that includes, in a calibration phase, scanning a first X-ray beam, having a first beam profile, across a feature of interest on a calibration sample and measuring first X-ray fluorescence (XRF) emitted from the feature and from background areas of the calibration sample surrounding the feature. Responsively to the first XRF and the first beam profile, a relative emission factor is computed. In a test phase, a second X-ray beam, having a second beam profile, different from the first beam profile, is directed to impinge on the feature of interest on a test sample and second XRF emitted from the test sample is measured in response to the second X-ray beam. A property of the feature of interest on the test sample is computed by applying the relative emission factor together with the second beam profile to the measured second XRF.

US patent application publication US20120288058A1 describes an X-ray multiple spectroscopic analyzer that includes an X-ray source, an optical system inputting X-rays to a single-crystal sample, a sample stage supporting the single-crystal sample, an X-ray diffraction detector, a rotation driving system that changes the angle of the X-ray diffraction detector, an X-ray diffraction measurement data storage unit, a structural analysis data analyzing unit, an energy-dispersive X-ray fluorescence detector, an X-ray fluorescence measurement data storage unit, an X-ray fluorescence analyzing unit, an X-ray fluorescence analysis data storage unit, and X-ray fluorescence analysis data acquiring unit. The structural analysis data analyzing unit analyzes the data of the crystal structure further on the basis of the analysis data of the fluorescent X-rays output from the X-ray fluorescence analysis data acquiring unit.

European patent EP1632770B1 describes a sample analysis system that makes use of both X-ray diffraction analysis and Raman spectroscopy of a sample. The sample is part of a sample library that is mounted on an XYZ stage that allows each sample to be examined in turn, as the XYZ stage is moved to position successive samples to a sample location. The system components may be mounted on a goniometer to allow their repositioning. A video system may be used for optical examination of the sample, and a knife edge may be used to prevent X-ray radiation from reaching a sample adjacent to the sample positioned at the sample location. A controller may be used to automatically control the operation of the analysis components and the movement of the sample holder to as to allow automated analysis of all of the samples in the sample holder. The system may comprise: an X-ray source that directs X-ray energy toward the sample; an X-ray detector that detects X-ray energy diffracted from the sample; and a Raman probe that detects photon energy scattered from the sample as a result of Raman excitation of the sample.

U.S. Pat. No. 6,829,327 describes a total-reflection X-ray fluorescence (TXRF) apparatus that may be used in detecting foreign matter on surfaces, for example, semiconductor wafers. The apparatus includes an X-ray source, a doubly-curved X-ray optic for diffracting and focusing the X-rays, a surface onto which at least some of the diffracted X-rays are directed, and an X-ray detector for detecting resultant X-ray fluorescence emitted by any foreign matter present on the surface. One or more apertures may be provided for limiting the dispersion angle of the X-rays. The crystal or multi-layer doubly-curved optic typically adheres to Bragg's law of X-ray diffraction and may be curved to a toroidal, ellipsoidal, spherical, parabolic, hyperbolic, or other doubly-curved shape. The patent also describes an apparatus for diffracting X-rays, the apparatus including an X-ray source and image defining an optic circle of radius $R_1$, an X-ray optic having a surface of radius $R_P$ and a plurality of atomic planes which intersect the surface at an angle ∝, wherein the radius of the atomic planes $R_P$ is defined by the equation $R_P=2R \cos(\propto)$. This diffracting apparatus may be used in a TXRF apparatus.

European patent EP0183043B1 describes a system for X-ray fluorescence analysis and/or X-ray diffraction analysis, in which, in the case of X-ray fluorescence analysis, primary radiation from an X-ray emitter is directed on to a sample and then, via analyzer crystals, to a detector or, in the case of X-ray diffraction analysis, the primary radiation is directed on to a sample and reflected, at the respective diffraction angle, on to the detector, the installation having coaxial goniometer circles, capable of being rotated and adjusted as selected, on which are mounted holders for the analyzer crystal, the sample and the detector, and being characterized by three concentric goniometer circles, whereby the first goniometer circle (G1) has, at one point on its perimeter, a holder (KT1) for a monochromator crystal and, at its center, a holder (KT2) for the analyzer crystal (AK), the second goniometer circle (G2) is equipped with a holder (PT) for the sample (P), the holder being such that it can be moved in a radial direction from the perimeter to the center, and the third goniometer circle (G3) carries the detector (D).

Korean patent publication KR20150145861B1 describes methods that relate to X-ray fluorescence analysis and statistical significance of X-ray diffractometry. Principal component analysis was used to obtain data for a cement and to construct libraries, through which an identification of an unknown cement composition was obtained.

US Patent application publication US20150003580A1 describes sample cell assemblies containing and holding powdered, granular, paste, or liquid samples that are assembled and manufactured in a way that allows them to be inexpensive enough to be disposable and configured to be attached to a fork member for providing shaking or vibrating movement to the samples for X-ray Diffraction and X-ray Fluorescence testing. The sample cell assemblies include the usage of double-sided adhesive films and a spacer for sealing the component of the sample cell assemblies, and latches as locking means for locking and unlocking the cell assemblies.

U.S. Pat. No. 4,263,510 describes a combined X-ray diffraction (XRD) and fluorescence spectroscopy (XRF) apparatus. According to this document, it is found that the sensitivity of the XRD-XRF apparatus for elements having atomic number below 16 can be substantially increased by use of an environmentally controllable three-cylinder X-ray path chamber in combination with the apparatus. Use of the chamber was surprisingly found to sufficiently increase the sensitivity so that element-identifying or characteristic lines of elements having atomic numbers at least as low as 10 could be measured.

European patent application publication EP3140643A1 describes an X-ray fluorescence (XRF) analysis system that can include an XRF analyzer which can communicate wirelessly with other devices. The system can also include remote-processor software configured to be loaded onto a handheld electronic device and/or remote-computer software configured to be loaded onto a remote-computer. The XRF analyzer can include a microphone and/or an output device to allow a user to communicate conveniently with the XRF analyzer.

European patent EP2513641B1 describes a method of performing X-ray diffraction (XRD) and/or X-ray fluorescence (XRF) analysis of a sample, comprising: irradiating a sample with X-rays from an X-ray source; providing a combined XRD and XRF detection arrangement comprising a scanning wavelength selector and at least one X-ray detector for detecting X-rays selected by the wavelength selector; and performing XRD analysis of the sample by selecting at least one fixed wavelength of X-rays diffracted by the sample using the scanning wavelength selector and detecting X-rays of the selected fixed wavelength(s) at one or more values of the diffraction angle, f, at the sample using the X-ray detector(s); and/or performing XRF analysis of the sample by scanning wavelengths of X-rays emitted by the sample using the scanning wavelength selector and detecting X-rays of the scanned wavelengths using the X-ray detector (s). Also provided is an apparatus for performing both X-ray diffraction (XRD) and X-ray fluorescence (XRF) analysis of a sample comprising a combined XRD and XRF detection arrangement comprising a scanning wavelength selector and at least one X-ray detector for detecting X-rays selected by the wavelength selector.

European patent EP2126553B1 describes an apparatus for carrying out both X-ray diffraction (XRD) and X-ray fluorescence (XRF) analysis of a crystalline sample. A sample holder is located within an evacuable chamber. An X-ray fluorescence source and a separate X-ray diffraction source are mounted within the evacuable chamber. An XRF detection arrangement is also provided, for detecting secondary X-rays emitted from the surface of the crystalline sample as a result of illumination by X-rays from the said X-ray fluorescence source. An XRD detection arrangement is then provided for detecting X-rays of a characteristic wavelength which have been diffracted by the crystalline sample. A moveable XRD support assembly is provided, comprising a first part configured to mount the XRD source for relative movement between the XRD source and the sample holder, and a second part configured to mount the XRD detection arrangement for relative movement between the XRD detection arrangement and the sample holder.

FIG. 2 is a schematic depiction of a known X-ray analysis apparatus 200 that is capable of acquiring both X-ray diffractograms and X-ray fluorescence spectra from a sample. Sample 71 is supported on or within a sample holder 215 and may comprise either a powder, a pressed pellet or a solid sample. Preferably, the sample surface having the sample points that are being analyzed is a substantially flat surface. A first X-ray source (not shown) that emits a wavelength suitable for X-ray diffraction analysis is configured to as to direct a first X-ray beam 201 onto a point 75 of the sample. Similarly, a second X-ray source (not shown) that emits a wavelength suitable for X-ray fluorescence analysis is configured to as to direct a second X-ray beam 203 onto the same sampled point 75. A plurality of X-ray detectors are arranged along an arc 72 of a circle and are configured to detect diffracted X-rays emitted at various respective angles by diffraction of the first X-ray beam 201. Specifically, the detectors are configured such that the sampled point 75, the central axis of the first X-ray beam 201 and the arc 72 along which the detectors are arrayed all substantially reside in the same geometric plane 209. (Note: neither the plane 209 nor the plane 211 is a physical component of the apparatus.)

A single energy-dispersive X-ray detector 205 is disposed so as to detect X-ray fluorescence photons emitted from the sampled point 75 in response to ejection of inner-shell electrons as a result of the absorption of energy from the second X-ray beam 203. The energy dispersive X-ray detector 205 is configured such that the X-ray beam 203 and the direct line of sight from point 75 to the inlet of the detector 205 define the plane 211, which is not parallel to the plane

209. The two planes 209, 211 intersect along the line 213 which passes through the sampled point 75. The sample holder 215 is supported by a two-axis translation stage assembly 220 which comprises a first translation stage 222 whose position is internally adjustable only parallel to a first axis, defined as the x-axis and a second translation stage 224 whose position is internally adjustable only parallel to a second axis (the y-axis) that is orthogonal to the x-axis. It should be noted that the planes 209 and 211 and their intersection 213 are defined by the static configuration of the sources and detectors of the apparatus 200. Likewise, the sampled point 75 is defined relative to the X-ray beams 201 and 203 but does not correspond to any fixed point on the sample. By operation of the two-axis translation stage assembly 220, a new point on the sample becomes the new sampled point, thereby allowing analytical scanning of the surface.

The configuration of the X-ray analysis apparatus 200 permits both X-ray diffraction analysis and X-ray fluorescence to be performed on each selected sampled point, thereby facilitating combined analysis of both the chemical composition and the crystalline phase composition of each such point. Advantageously, the apparatus 200 eliminates the requirement for separate X-ray diffraction and fluorescence instruments. Nonetheless, because each incident X-ray beam 201, 203 interferes with the detection of X-rays emitted or diffracted in response to the other X-ray beam, the two analyses cannot or each sampled point cannot be conducted simultaneously. Instead, the two analyses must be conducted sequentially, with each X-ray beam being blocked or switched off when the other beam is incident upon the sampled point. Accordingly, the operational efficiency of the apparatus is not optimal.

In view of the above background and in view of the increasing need for efficient characterization of materials and/or products using multiple analytical techniques, the inventor has identified a need for efficiently operating apparatuses and methods that can provide combined simultaneous multi-technique analyses of samples. In a preferred embodiment, an X-ray diffraction and X-ray fluorescence analysis apparatus is provided that can simultaneously obtain XRD and XRF data as well as, optionally, non-X-ray optical spectroscopic data, from each one of a plurality of locations on the surface of a sample that is no larger than fifty millimeters in diameter without any interference of the X-ray diffraction measurements from the XRF X-ray beam and vice versa. The inventor has also identified the need for a compact moveable support assembly for analyzing multiple locations on the surface of a sample that is to be analyzed by combined XRD and XRF, wherein the compact moveable support assembly may be accommodated into an existing analytical apparatus, such as an XRD diffractometer. The inventor has also identified the need for a software package that can control the movement of the compact moveable support assembly to enable efficient acquisition of analytical data from plural locations on such a sample using multiple analytical techniques and that can provided reliable cross-technique matching of the data obtained from any particular location on the sample. The present invention addresses such needs.

SUMMARY OF THE INVENTION

In the roadmap of development of in-field instruments for the SOLSA project (EU H2020 grant 689868), the inventor has combined the techniques of X-ray diffraction analysis, X-ray fluorescence analysis and, optionally, other forms of spectroscopic and physical analysis into a single analytical apparatus, in order to save space and time. This need of this type of combination has been explained by many end users, since the complementarity of the XRD and XRF techniques is high. A related commonly-assigned European patent application, titled "Methods for on-line instrumental combination and data fusion in materials characterization", the filing date of which is identical to the filing date of this application, describes additional data-related methodologies that are applicable to the SOLSA project.

To perform simultaneous analyses of a sample using different analysis techniques, each of which includes both photon illumination and photon detection, the inventor has recognized that it is necessary to avoid interference of the detection of a first photon beam by a second photon beam and interference of detection of the second photon beam by the first photon beam. An important example is interference caused when a first X-ray beam is used for XRD analysis of a sample and a second X-ray beam is used for XRF analysis of the same sample. Accordingly, exemplary apparatuses and methods are herein taught in which a first location on a sample is analyzed by XRD analysis and a second location on the sample is analyzed by XRF analysis. A first plane is defined by the incident and diffracted X-rays that intersect at the first sample location that undergoes XRD analysis. A second plane is defined by: (a) a first line from an XRF X-ray source to a second sample location and (b) a second line from the second sample location to an XRF detector. To prevent interferences between the two simultaneous measurements, then the two planes defined above should preferably not intersect one another on the sample surface. In some embodiments, the two planes may be parallel. Further, at least one X-ray shielding component should be disposed between the two planes. Accordingly, the X-ray shielding component should be disposed between the first sample location and the second sample location. The X-ray shielding component is able to block X-rays that are emitted from the first sample location from being detected by the XRF detector and to block X-rays that are emitted from the second sample location from being detected by the XRD detector.

The invention is not limited to X-ray analysis techniques, i.e. in other embodiments, non-X-ray optical spectroscopic techniques may be employed (for example, ultra-violet, visible or infrared analysis techniques). Accordingly, it should be understood that whilst the invention is illustrated herein mainly with reference to X-ray analysis techniques, the principles described apply as well to non-X-ray techniques. References to X-ray sources, X-ray beams and X-ray detection are therefore to be understood as examples of photon sources, photon beams and photon detection. The invention is particularly applicable to simultaneously operated multiple analysis techniques in which interference of the detection of a first photon beam by a second photon beam and interference of detection of the second photon beam by the first photon beam should be avoided. The invention is thus applicable where the wavelengths of the first and second photon beams being detected at least partially overlap. In such embodiments, a shielding component should be disposed between the first sample location and the second sample location that is able to block photons that are emitted from the first sample location from being detected by the second photon detector and to block photons that are emitted from the second sample location from being detected by the first photon detector. The shielding component should thus be non-transmissive to the photons being detected. The shielding component may comprise a single part or a plurality of parts (e.g. a plurality of shields).

The inventor has further recognized that, if a rotational axis of a sample support assembly is positioned in the middle of the two sample locations, then each point at the surface of the sample along an arc, preferably a circular arc or a ring, that passes through the two locations and that is centered on the rotational axis, may be conveniently measured by both XRD and XRF. Optionally, other locations on the sample may be analyzed by one or more non-X-ray analytical techniques. One aspect of the proposed solution, therefore, is to either replace one translation stage of a conventional x-y translation assembly by a rotation stage or augment an x-y translation assembly with an additional rotation stage. With such a support assembly and with the parallel plane configuration, each location probed by one technique (either XRD or XRF) can be successively probed by the other technique by a simple rotation, whereby the rotation angle depends upon the amount by which an underlying translation stage is moved. A shielding set in place between the two planes, above the sample surface, will prevent interferences. The symmetry of the proposed configuration leads to the use of an Eulerian map (instead of a Cartesian map) for maximum efficiency.

According to a first aspect of the present teachings, an analysis apparatus is provided, comprising:
- a moveable stage assembly;
- a sample holder that is adapted to be mounted on a top surface of the moveable stage assembly;
- a first photon source and a first photon detector or detector array, wherein the first photon source is configured to emit a first beam of photons that is configured to intercept the surface of a sample that is mounted on or within the sample holder at a first location on the sample and wherein the first photon detector or detector array is configured to detect photons that are emitted from the first location; and
- a second photon source and a second photon detector or detector array, wherein the second photon source is configured to emit a second beam of photons that is configured to intercept the surface of the sample that is mounted on or within the sample holder at a second location on the sample simultaneously with the first beam intercepting the surface of the sample at the first location, the second location being spaced apart from the first location, and wherein the second photon detector or detector array is configured to detect photons that are emitted from the second location.

According to some embodiments, the moveable stage assembly may comprise: a first translation stage assembly comprising a first platform that is moveable along a first substantially horizontal axis; and, optionally, a second translation stage assembly mounted on the platform of the first translation stage assembly and comprising a second platform that is moveable along a second substantially horizontal axis that is substantially perpendicular to the first substantially horizontal axis, the second platform having a top surface of the moveable stage assembly. According to a more preferable alternative embodiment, the second platform does not have the top surface of the moveable stage assembly and, instead, an additional rotation stage is mounted on top of the second translation assembly, wherein the rotation stage has the top surface of the moveable stage assembly. According to another preferred alternative embodiment, the moveable stage assembly comprises: a translation stage assembly comprising a platform that is moveable along a substantially horizontal axis; and a rotation stage assembly mounted on the platform of the translation stage assembly and having the top surface of the moveable stage assembly. The substantially horizontal axis or one of the two substantially horizontal axes, along which the platform of the translation stage is moveable, is preferably substantially perpendicular to a straight line connecting the locations where the X-ray beams intercept the sample surface. According to some embodiments, the analysis apparatus may also include a height adjustment mechanism operable to adjust a vertical position of the sample surface relative to the first and second X-ray sources.

According to preferred embodiments, the first and second photon sources are X-ray sources, the first and second photon beams comprise X-ray beams and the first and second photon detectors or detector arrays are configured to detect X-rays. According to some embodiments, the first detector or detector array comprises an array of X-ray detectors disposed along an arc or an X-ray detector that is moveable along an arc to detect diffracted X-rays emitted at various respective angles by diffraction of the first X-ray beam; and the second detector or detector array consists of an energy-dispersive X-ray fluorescence detector. In such embodiments, the first X-ray source and the detector or detector array comprise an X-ray diffraction (XRD) analytical subsystem and the second X-ray source the energy-dispersive X-ray fluorescence detector comprise an X-ray fluorescence (XRF) analytical subsystem, with the two subsystems capable of performing simultaneous analyses of a sample, the simultaneous analyses being performed at different sample locations. The moveable stage assembly may subsequently be operated such that the location upon which XRD analysis was initially performed is subsequently moved to a position in which it may be analyzed by XRF and such that the location upon which XRF analysis was initially performed is moved to a position in which it may be analyzed by XRD. Alternative embodiments are envisioned in which both analysis subsystems are of the same type—e.g., both subsystems being directed to XRD analysis or both subsystems being directed to XRF analysis.

Common X-ray sources for X-ray Fluorescence analyses use polychromatic radiation emitted from molybdenum, rhodium silver or tungsten anodes. Common X-ray sources for X-ray diffraction studies generally use a monochromatic beam of radiation emitted from a copper or cobalt anode for accuracy in determining structural parameters. According to some embodiments, one or both of the X-ray beams may be collimated by means of one or more collimators. Collimation provides the capability of directing a small beam size onto the sample, which is useful for mapping features on the sample with good mapping resolution. If the sample is a powdered sample, then high spatial resolution is generally unnecessary and collimators may not be required. In such instance, the resulting wide beam size may be beneficial for conducting rapid analysis. On the other hand, if the sample is a polycrystalline or otherwise inhomogeneous bulk sample, then a certain mapping resolution will generally be required. In such instances, the size of the collimated beam may be chosen based on the desired spatial resolution. Optional collimators may be provided as accessories in order to optimize one or the other application.

According to some preferred embodiments of apparatuses that comprises both an XRD analytical subsystem and an XRF analytical subsystem, at least one X-ray shielding device is configured such that the second X-ray detector or detector array is prevented from receiving either X-rays emitted from the first X-ray source or X-rays that are emitted from the first location and/or such that the first X-ray detector or detector array is prevented from receiving either X-rays emitted from the second X-ray source or X-rays that are emitted from the second location. Generally, the first X-ray beam and, the first sample location and the first X-ray detector or detector array define a first plane and the second X-ray beam, the second sample location and the second X-ray detector or detector array define a second plane. In some embodiments, the first and second planes may be parallel to one another.

In various embodiments, an analysis apparatus in accordance with the present teachings comprises a computer or electronic logic controller electronically coupled to the moveable stage assembly and comprising computer readable instructions that are operable to cause the computer or electronic logic controller to cause movement of the movement of the stage assembly such that various points on a sample surface, such as pre-identified features of interest, may be brought into position for analysis by a first analytical technique and/or analysis by a second analytical technique. Note that a sample location is "in position" for analysis when the sample location is illuminated by one of the photon beams. As noted above, in some embodiments, the moveable stage assembly may comprise an x-y translation-stage assembly, such as an assembly comprising a first translation stage that is operable to move the sample parallel to a first substantially horizontal axis and a second translation stage, mounted atop the first translation stage, that is operable to move the sample parallel to a second substantially horizontal axis that is perpendicular to the first axis. In some embodiments, a rotation stage may be mounted on top of the second translation stage.

In certain preferred embodiments, the moveable stage assembly comprises: a translation stage assembly comprising a platform that is moveable along a single substantially horizontal axis; and a rotation stage assembly mounted on the platform of the translation stage assembly and having the top surface of the moveable stage assembly. In such embodiments, computer readable instructions may be operable to cause the computer or electronic logic controller to cause the moveable stage assembly to translate the sample parallel to the substantially horizontal axis and/or to cause the rotation stage assembly to rotate the sample orientation about the substantially vertical rotation axis such that a feature of interest on the sample surface is illuminated by one of the first and second photon beams. In such embodiments, a sample location that has been analyzed by a first analytical technique (e.g., XRD) may be brought into position for analysis by a second analytical technique (e.g., XRF) by a simple stage rotation and vice versa. In various embodiments, the computer readable instructions are further operable to cause the computer or electronic logic controller to read user-input coordinates of a feature of interest and subsequently, using these coordinates, cause the translation stage assembly to move the sample by an appropriate distance and/or rotate the rotation stage and sample by an appropriate angular amount such that the feature of interest in in position for analysis. In certain embodiments, the computer readable instructions are operable to cause the computer or electronic logic controller to cause the moveable stage assembly to repeatedly translate the sample parallel to the substantially horizontal axis and/or cause the rotation stage assembly to repeatedly rotate the sample orientation about the substantially vertical rotation axis such that a plurality of locations on the sample surface are successively illuminated by one or both of the first and second photon beams, wherein the plurality of locations comprise an array of locations that are approximately evenly distributed throughout a portion of the sample surface.

According to some embodiments, an analysis apparatus may comprise an analysis probe that is configured to acquire spectroscopic data from a third location on the sample surface, wherein the acquisition of the spectroscopic data from the third location is based on a third analytical technique. For instance, if the first and second analytical techniques comprise X-ray diffraction analysis and X-ray fluorescence analysis, then the third analytical technique may comprise a spectroscopic technique that does not require X-ray illumination of the third location. For example, various fiber-optic-based probes are known which may be used to analyze the third sample location and thereby provide further chemical or mineralogical information about the sample being analyzed. Fiberoptic probes are known that may be used to perform spot analyses using Raman spectroscopy, UV-visible reflection or fluorescence spectroscopy, infrared reflectance spectroscopy, diffuse reflectance infrared Fourier transform (DRIFT) spectroscopy, laser-induced breakdown spectroscopy (LIBS), etc.

In accordance with a second aspect of the present teachings, a method for performing X-ray analyses of multiple locations on a sample surface is provided, the method comprising:

(a) mounting a sample holder having a prepared sample therein or thereon onto a moveable stage assembly or loading the prepared sample onto or into a sample holder on the moveable stage assembly of an analysis apparatus that comprises: a first photon source and a first photon detector or detector array, wherein the first photon source is configured to emit a first beam of photons that is configured to intercept the surface of the prepared sample that is mounted on or within the sample holder at a first sample location and wherein the first photon detector or detector array is configured to detect photons that are emitted from the first sample location; and a second photon source and a second photon detector or detector array, wherein the second photon source is configured to emit a second beam of photons that is configured to intercept the surface of the prepared sample that is mounted on or within the sample holder at a second sample location, the second sample location being spaced apart from the first sample location, and wherein the second photon detector or detector array is configured to detect photons that are emitted from the second sample location;

(b) acquiring first data relating to photons emitted from the first sample location and detected by the first photon detector or detector array and, simultaneously with the acquiring of the first data, acquiring second data relating to photons emitted from the second sample location and detected by the second photon detector or detector array;

(c) operating the moveable stage assembly such that the first photon beam intercepts the surface of the prepared sample at a third sample location; and (d) acquiring third data relating to photons emitted from the third sample location and detected by the first photon detector or detector array.

According to preferred embodiments of the second aspect of the present teachings:

the first photon source is a first X-ray source; the second photon source is a second X-ray source;

the first beam of photons is a first X-ray beam;
the second beam of photons is a second X-ray beam;
the first photon detector or detector array is a first X-ray detector or detector array that is configured to detect X-rays that are diffracted by the sample at the first location;
the second photon detector or detector array is a second X-ray detector or detector array that is configured to detect X-ray fluorescent emissions from the second location;
the first data relates to diffracted X-rays emitted from the first sample location;
the second data relates to X-rays emitted from the second sample location as a result of X-ray fluorescence; and
the third data relates to diffracted X-rays emitted from the third sample location.

However, according to some other embodiments, the first and second data may relate to X-rays diffracted from the first location and the second location, respectively. According to yet other embodiments, the first and second data may relate, respectively, to X-rays emitted from the first location as a result of X-ray fluorescence and to X-rays emitted from the second location as a result of X-ray fluorescence. In some instances, the operating of the moveable stage assembly may cause the second photon beam to intercept the surface of the prepared sample at the first sample location. One or both of the X-ray beams may be collimated, depending on the requirements of a particular experiment.

In some instances, the method may further comprise: a first additional step of constructing a map of features of interest on the surface of the prepared sample that is executed prior to the execution of the step (b); and a second additional step, also prior to execution of the step (b), of operating the moveable stage assembly such that the first photon beam intercepts the sample surface at map coordinates of a first one of the features of interest, whereby said map coordinates comprise the first sample location. In some instances, the constructing of the map of features of interest may comprise constructing an Eulerian map, the coordinates of which are expressed directly in terms mechanical translational motion and mechanical rotational motion.

According to a third aspect of the present teachings, a computer software product is provided, the computer software product comprising tangibly embodied computer readable instructions that are operable to cause a computer or other logic controller to:

cause a first photon detector or detector array to acquire first data relating to photons detected by the first photon detector or detector array and emitted from a first sample location in response to illumination of the first sample location by a first photon beam;

cause a second photon detector or detector array to acquire second data relating to photons detected by the second photon detector or detector array and emitted from a second sample location in response to illumination of the second sample location by a second photon beam, the acquiring of the second data occurring simultaneously with the acquiring of the first data;

cause a moveable stage assembly supporting the sample to move the sample such that the first photon beam intercepts the surface of the prepared sample at a third sample location; and cause the first photon detector or detector array to acquire third data relating to photons detected by the first photon detector or detector array and emitted from the third sample location in response to illumination of the third sample location by the first photon beam.

BRIEF DESCRIPTION OF THE DRAWINGS

In order to best understand the features and advantages of the teachings of this disclosure, the reader is referred to the appended drawings, which are to be viewed in conjunction with the detailed description of certain examples provided below. Understanding that these drawings depict only exemplary embodiments of the invention and are not therefore to be considered to be limiting in scope, the examples will be described and explained with reference to the accompanying drawings in which.

DETAILED DESCRIPTION OF THE INVENTION

As used in this document, the terms "photon", "photon source" (or, alternatively, "source of photons"), "photon beam" (or, alternatively, "beam of photons") and "photon detection" and "photon detector" pertain generally to any electromagnetic radiation, source apparatus for generating electromagnetic radiation, beam or ray of electromagnetic radiation, detection of electromagnetic radiation and device for detecting electromagnetic radiation, respectively. The use of these terms does not necessarily require or imply the use of photon counting detection or photon-energy detection and does not necessarily preclude the use of wavelength-based separation or wavelength-based detection.

Figure 1:
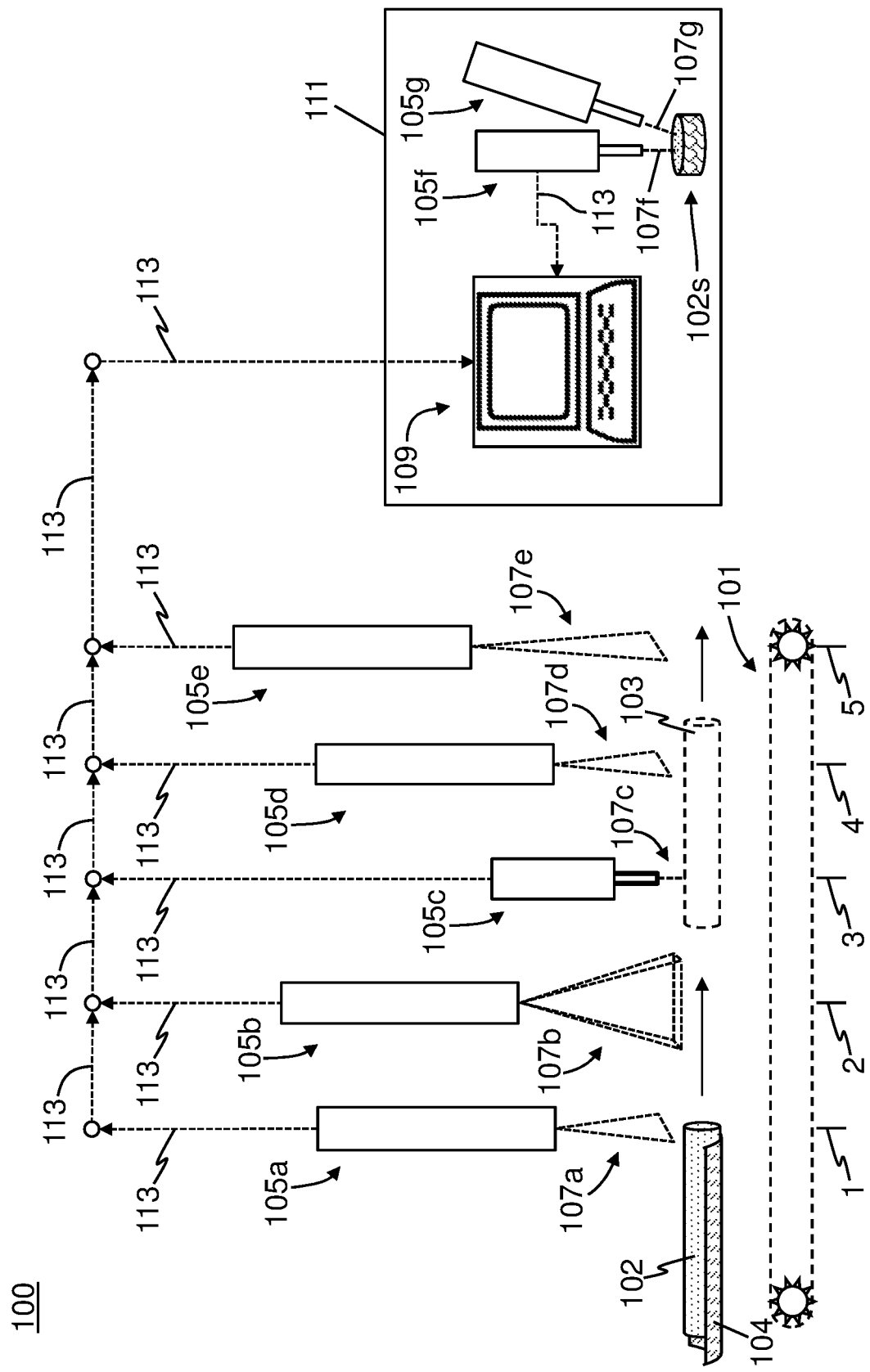
FIG. 1 is a schematic depiction of a system for real-time on-site compositional and phase characterization of samples that are provided as a continuous or nearly-continuous flux of samples.
Figure 2:
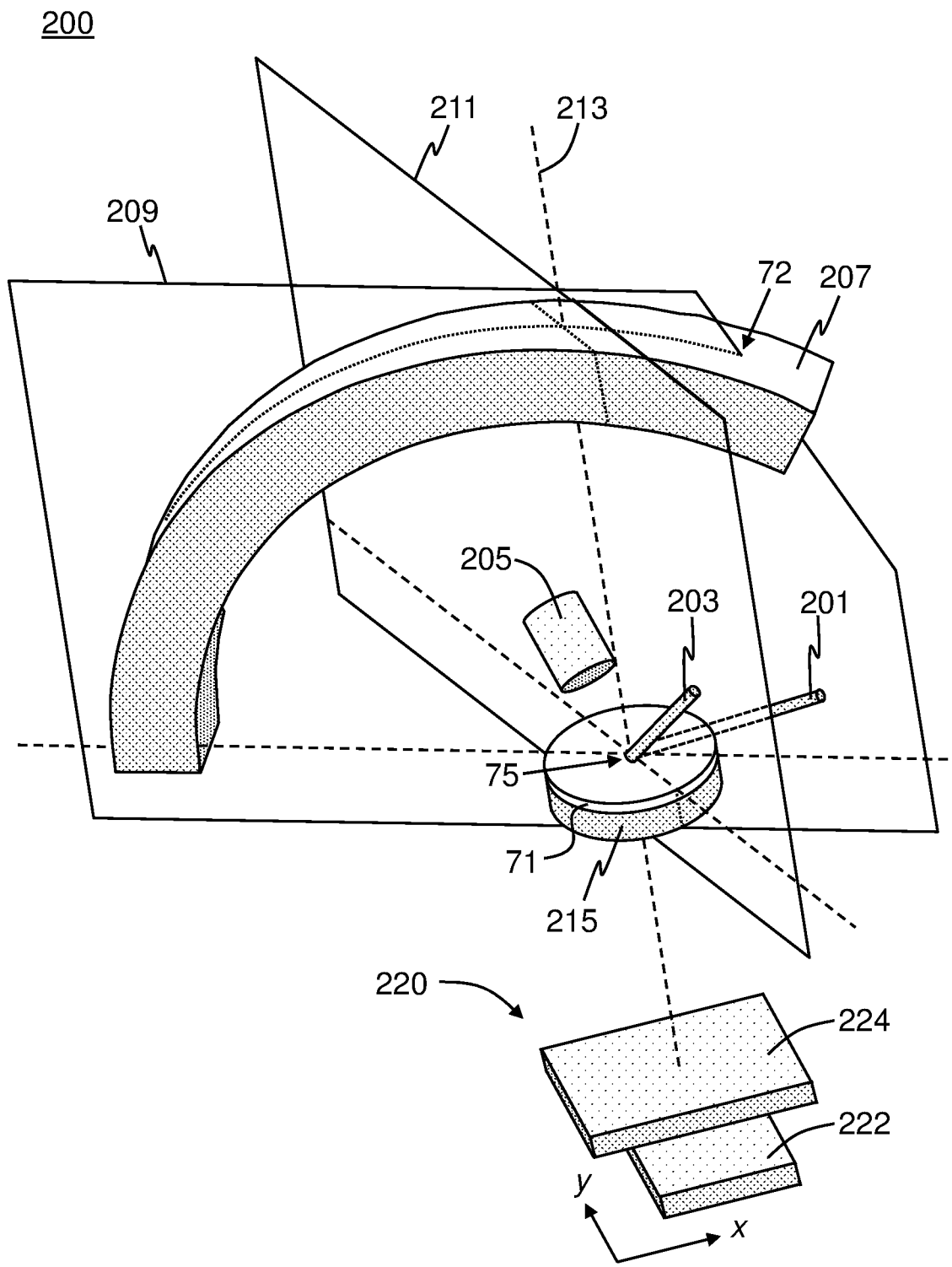
FIG. 2 is a schematic depiction of a known X-ray analysis apparatus that is capable of acquiring both X-ray diffractograms and X-ray fluorescence spectra from a sample.
Figure 3A:
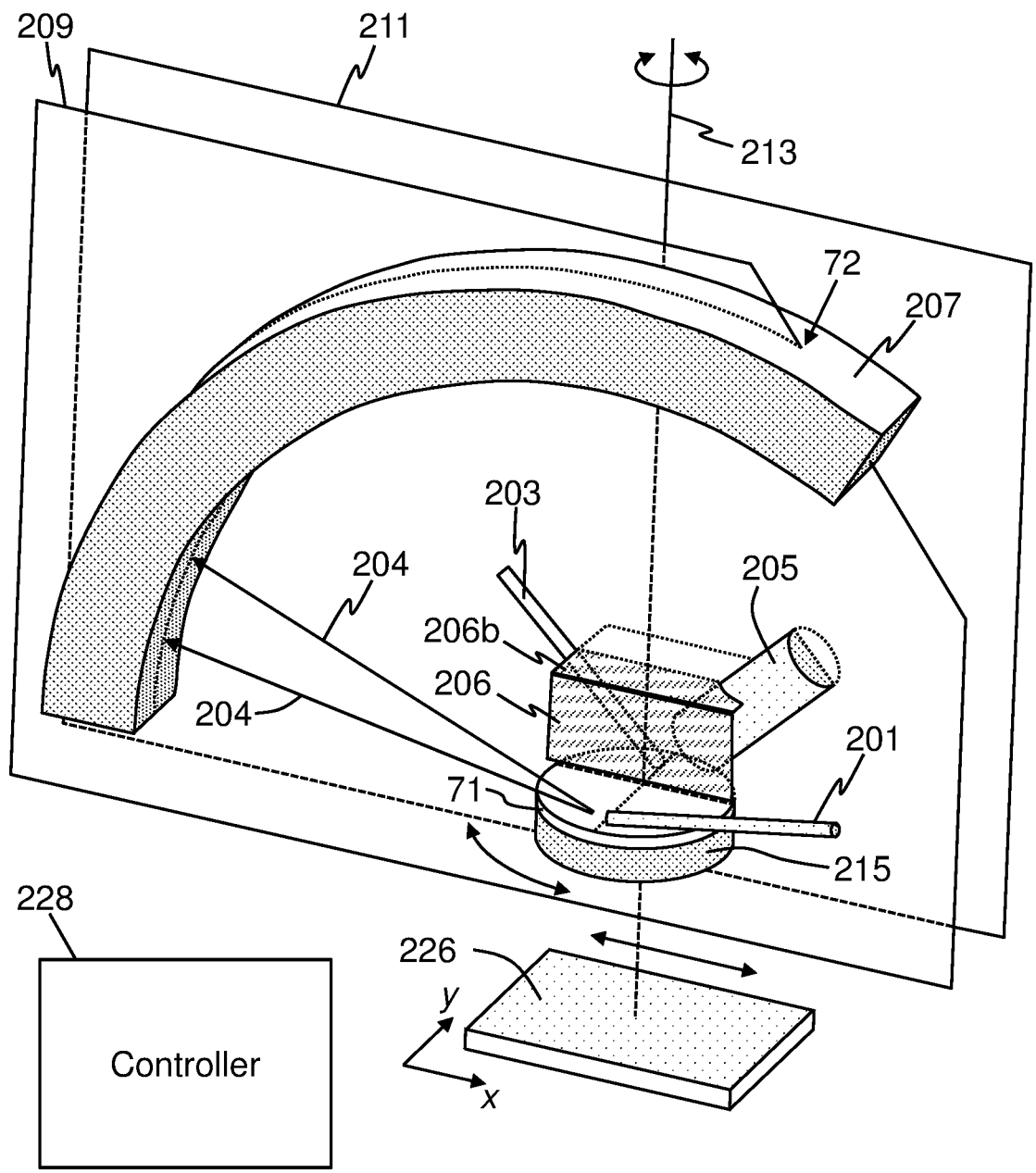
FIG. 3A is a schematic depiction of an embodiment of an X-ray analysis apparatus in accordance with the present teachings that is capable of simultaneous acquisition of an X-ray diffractogram and an X-ray fluorescence spectrum from different locations on a single sample.

FIG. 3A is a schematic depiction of an analysis apparatus 300, in accordance with the present teachings, that is capable of acquiring both X-ray diffractograms and X-ray fluorescence spectra from a sample. In contrast to the configuration of the apparatus 200 (FIG. 2), the apparatus 300 is configured such that the two X-ray beams do not illuminate a same point. Accordingly, two sampled points may be illuminated simultaneously. Further, a shielding structure, comprising shielding components 206 and 206b and comprising an X-ray absorbing material such as lead foil, is implemented between the two sampled points. Although the shielding structure is illustrated as two separate components, it may be fabricated as a single integrated structure. The shielding structure shields the X-ray diffraction detector array 207 from interference from X-rays generated by impingement of the second X-ray beam 203 onto the sample 71 and also shields the X-ray fluorescence detector 205 from stray X-rays generated by impingement of the first X-ray beam 201 onto the sample. This permits X-ray diffraction analysis and X-ray fluorescence analyses to be performed simultaneously, albeit on separate sampled points.

In operation of the analysis apparatus 300 (FIG. 3A), a first sampled point 77a is illuminated by the X-ray beam 201 emitted by the first X-ray source. The second sampled point 77b (see FIGS. 6A and 6B), which is obscured in FIG. 3A by the shielding structure, is illuminated by the X-ray beam 203 emitted by the second X-ray source. Preferably but not necessarily, the two planes 209 and 211, which are associated with diffracted X-rays and fluorescently emitted X-rays, are parallel to one another. These two planes are defined similarly to the way they are defined with respect to the apparatus 200 (FIG. 2).

Figure 4:
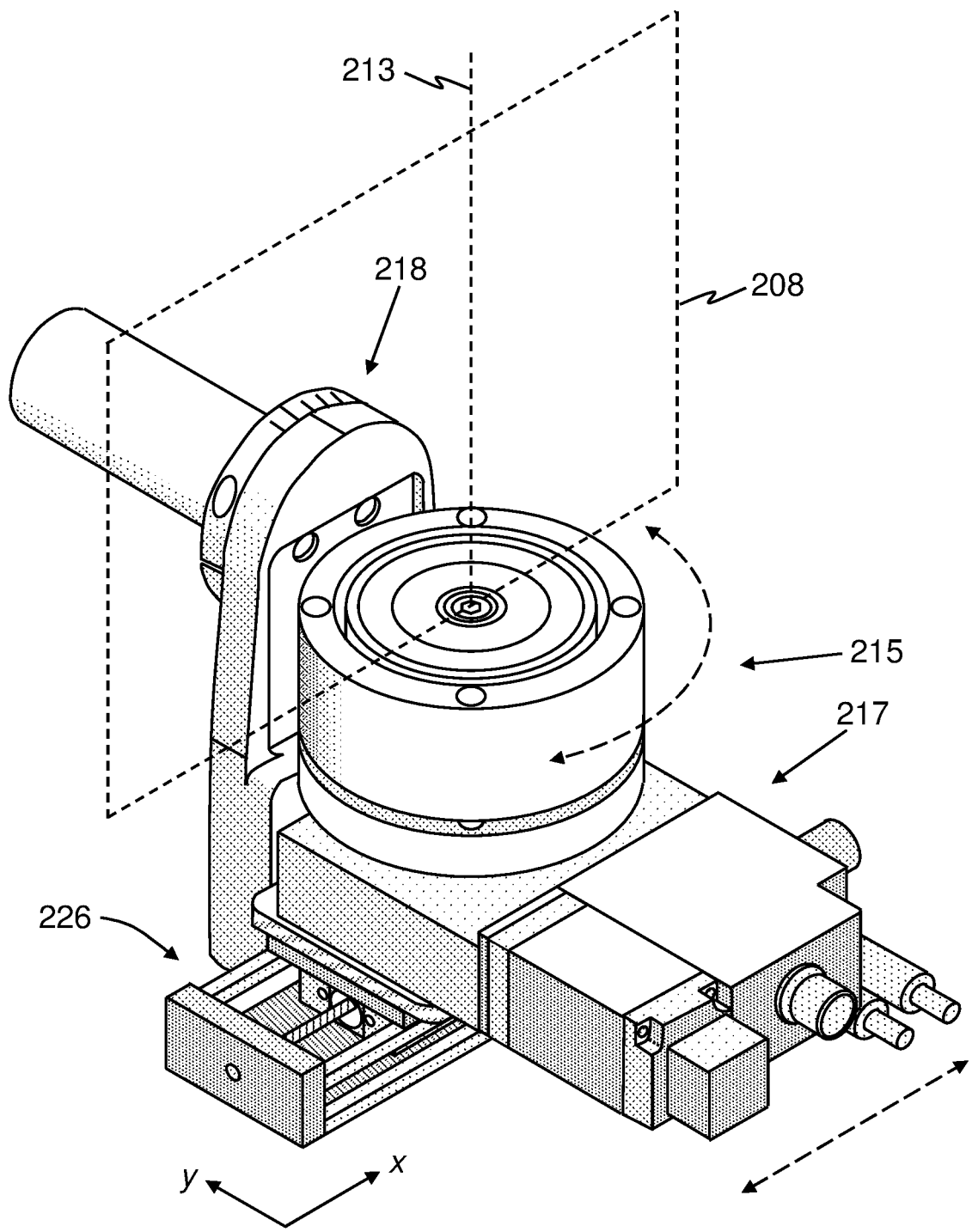
FIG. 4 is a detailed depiction of a configuration of a sample holder, a rotation stage and a translation stage as may be utilized in an X-ray analysis apparatus in accordance with the present teachings.

In some instances, a two-axis translation stage assembly 220, as is depicted in FIG. 2 may be employed to support the sample holder and to translate the sample holder parallel to horizontal x- and y-axes so that various locations on the sample surface come under illumination by one or the other of the X-ray beams 201, 203, at which positions they may be analyzed by either XRD or XRF. However, it is advantageous, under many circumstances, to instead employ a moveable stage assembly comprising a rotatable sample stage 217 mounted atop a linear translation stage, in the form of single translation stage 226 as is illustrated in FIG. 4.

With such a moveable stage assembly, it is possible to obtain both XRD and XRF data for various specific individual locations on the surface of the sample 71. Such combined analyses may be achieved by rotating the rotation stage 217, together with the sample holder 215 and the sample 71 by a specific angle that depends on the physical separation between the two X-ray illuminated points and the distance of the specific point of interest from the axis of rotation. Such procedure is further described below with reference to FIGS. 6A and 6B.

Figure 6A:
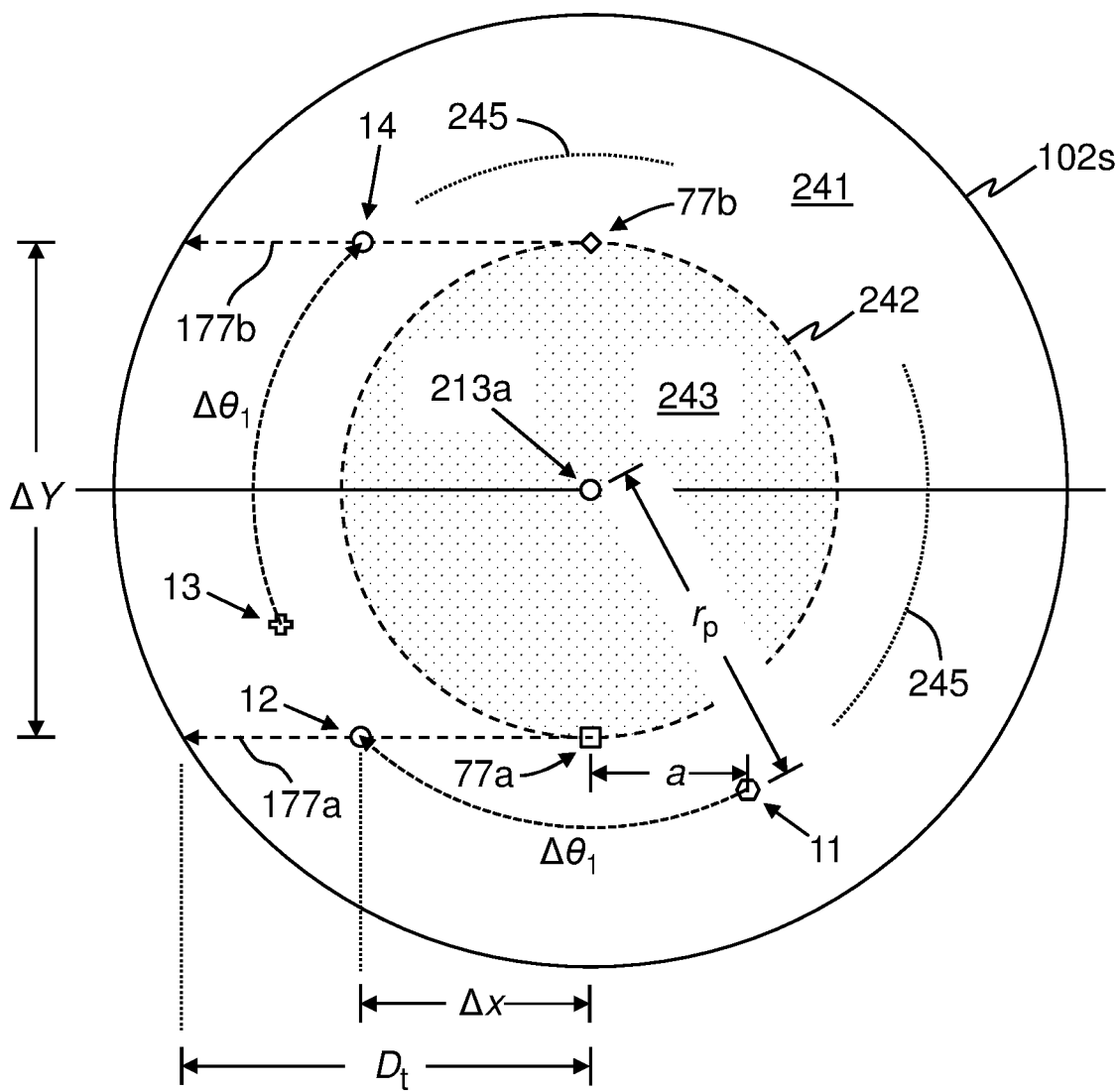
FIG. 6A is a schematic depiction of a surface of a sample undergoing analysis by both X-ray diffraction and X-ray fluorescence in accordance with the present teachings, showing positioning of selected sample points for analysis by combined translation and rotation of a sample holder.
Figure 6B:
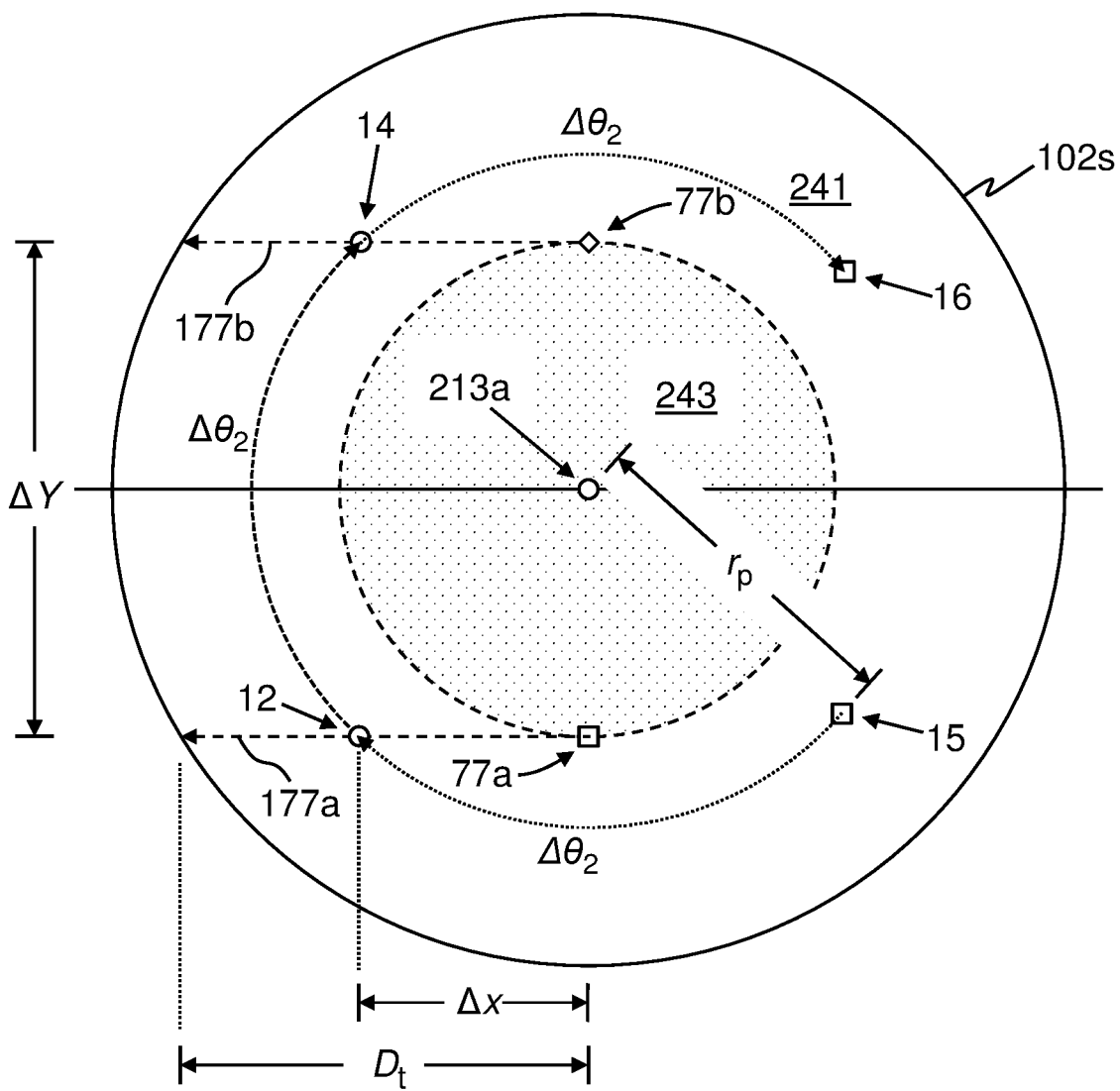
FIG. 6B is another schematic depiction of the sample surface of FIG. 6A, showing additional positioning of selected sample points for analysis by combined translation and rotation of a sample holder.

With the configuration shown in FIG. 6B, the rotation axis 213 passes through the center of the rotatable sample holder 215 and is disposed midway between the planes 209 and 211. Because the rotation stage can be used to move various points of the sample surface into either of the X-ray beams 201, 203, the analysis apparatus 300 does not necessarily require a two-axis translation stage as is employed in the system 200 (FIG. 2). Instead, the system 300 preferably utilizes a single translation stage 226, the position of which is adjustable in only one dimension, which is here defined as the x-axis. The x-axis here is perpendicular to a straight line connecting the locations where the X-ray beams 201, 203 intercept the sample surface. It will be appreciated that, in some other embodiments, the rotatable sample stage 217 can be mounted atop a two-axis translation stage (x and y axes) if required.

The apparatus 300 includes one or more computer(s) and/or other logic controller(s) 228 that is/are electrically coupled to the X-ray sources (not shown) the X-ray fluorescence detector 205, the X-ray diffraction detector array 207, the translation stage 226 and the rotation stage. The computer(s) and/or other logic controller(s) 228 comprises computer-readable programmatic instructions, either software and/or firmware, that is operable to cause the computer(s) and/or other logic controller(s) 228 to control aspects of the operation of the X-ray sources, X-ray detectors, rotation and translation stages and, if present, other spectroscopic probes. For instance, the computer(s) and/or other logic controller(s) 228 may be electrically coupled to power supplies and shutters of the X-ray sources that control the times that X-ray beams are active. The computer(s) and/or other logic controller(s) 228 may also be electrically coupled to actuators of the translation and/or rotation stages 222, 224, 226, 215 that cause these actuators to move the stages and thereby move the sample in accordance with the computer readable instructions. The computer(s) and/or other logic controller(s) 228 may also be electrically coupled to power supplies of the detector 205 and detector array 207 that activate and de-activate the detectors and may also be configured to read data acquired by the detectors. The computer(s) and/or other logic controller(s) 228 may also be electrically coupled to one or more user interfaces or network interfaces that are used to communicate user-input operational parameters to the apparatus as well as to output analytical results back to the user.

Figure 3B:
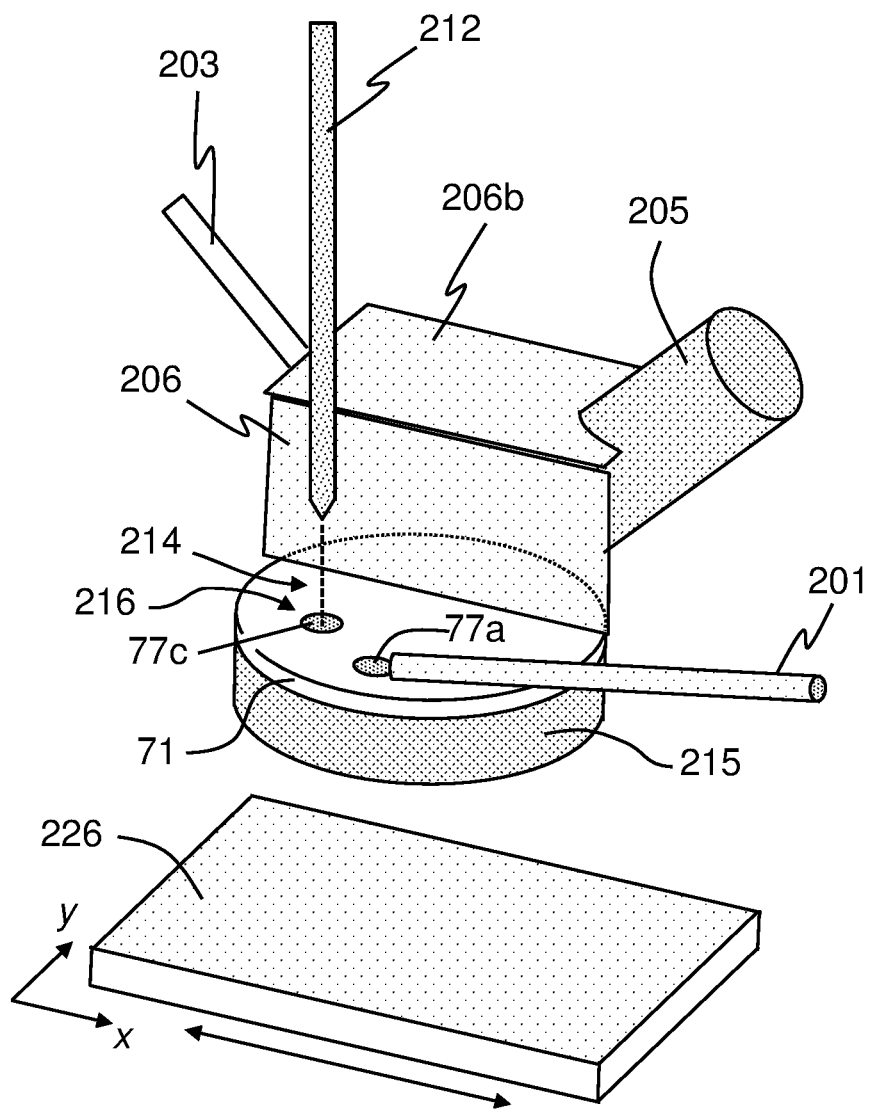
FIG. 3B is an expanded view of a portion of the X-ray analysis apparatus of FIG. 3A showing the provision of an additional analysis probe that provides information derived by an analysis method other than X-ray analysis.

FIG. 3B schematically depicts an expanded view of a portion of the analysis apparatus 300 showing how one or more additional analysis probes 212 may be incorporated into the apparatus. For example, various fiberscope devices and fiber-optic-based probes are known which may be used to either view the surface 71 of the sample that is being analyzed and/or to provide further chemical or mineralogical information about the sample being analyzed. Fiberoptic probes are known that may be used to perform spot analyses using Raman spectroscopy or infrared reflectance spectroscopy (e.g. diffuse reflectance infrared Fourier transform (DRIFT) spectroscopy). In each such case, one or more optical fibers and/or lenses provide light that is incident upon a small region of the sample and one or more fibers and/or lenses collect light that is either reflected from or generated within the sample. FIG. 3B schematically illustrates the use of an analysis probe being used to collect spectroscopic data from sampled point 77c at the same time that X-ray beam 201 is delivered to sampled point 77a for the purpose of acquiring an X-ray diffractogram of that point. Other fiber-bundle devices may be used to transmit a visible-light image or hyperspectral image of the sample to a video camera. Such a probe may be used to aid the selection of points on the sample surface for further analysis by XRD and XRF or by a spectroscopic technique. In other embodiments, spectroscopic probes other than fiber-based probes may be used. For example, a laser may directly probe the surface location and light emanating from the surface location may be collected via an optical system comprising one or more lenses and/or one or more mirrors and directed to a detector. Techniques such as Laser-Induced Breakdown Spectroscopy (LIBS) or Raman spectroscopy may be employed in this way.

FIG. 4 is a detailed perspective view of a sample positioning assembly for use in a combined XRD and XRF analysis apparatus in accordance with the present teachings. The positioning assembly comprises a translation stage 226 that is mounted on a conventional X-ray diffraction goniometer stage 218, a rotation stage 217 and its drive mechanism mounted on the translation stage, and a sample holder 215 mounted on the rotational stage. Both the translation stage and the rotation stage may be digitally controlled using stepper motor drive systems and precisely positioned using rotational encoder systems, such as optical encoder systems. In operation of the combined XRD and XRF analysis apparatus, the sample holder 215 and the sample (not shown in FIG. 4) are caused to rotate about the rotation axis 213 (see also FIG. 3A), which is coincident with a central longitudinal axis of sample holder 215. Plane 208, which is fixed relative to the apparatus, contains the rotation axis 213 and is parallel to the movement direction of the translation stage 226. This movement direction is defined herein as the x-axis. In operation of the combined XRD and XRF analysis apparatus, the sampled locations or points (which are also fixed relative to the apparatus) are disposed approximately equidistantly from and on opposite sides of the plane 208 along a line that is normal to the plane 208. It follows that the sampled locations or points are disposed approximately equidistantly from the rotation axis 213. Note that, although the rotation axis 213 is fixed relative to the sample holder 215, it is not fixed relative to the combined XRD and XRF analysis apparatus. Instead, the sample holder 215 and rotation stage 217 move together parallel to the x-axis as the translation stage 226 is operated.

Figure 5A:
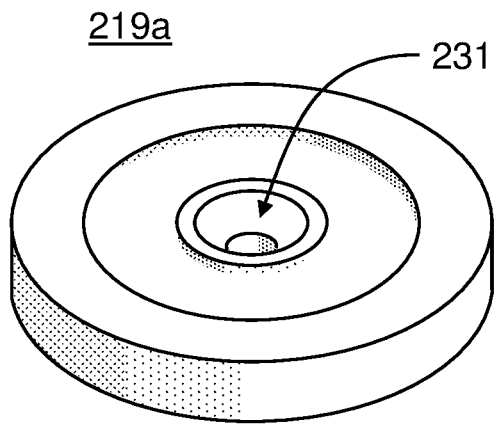
FIG. 5A is a schematic depiction of a sample holder module for containing powdered samples as may be as may be utilized in an X-ray analysis apparatus in accordance with the present teachings.
Figure 5B:
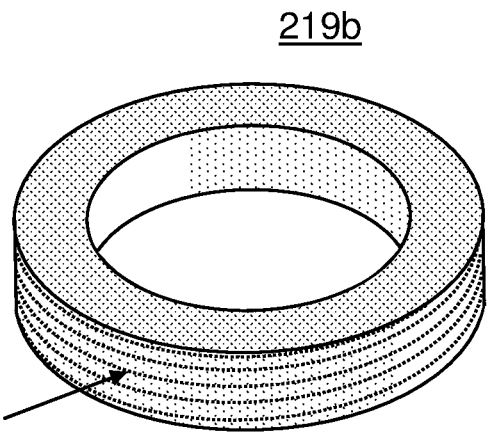
FIG. 5B is a schematic depiction of a commercially available sample holder ring for containing pressed pellet samples as may be as may be utilized in an X-ray analysis apparatus in accordance with the present teachings.
Figure 5C:
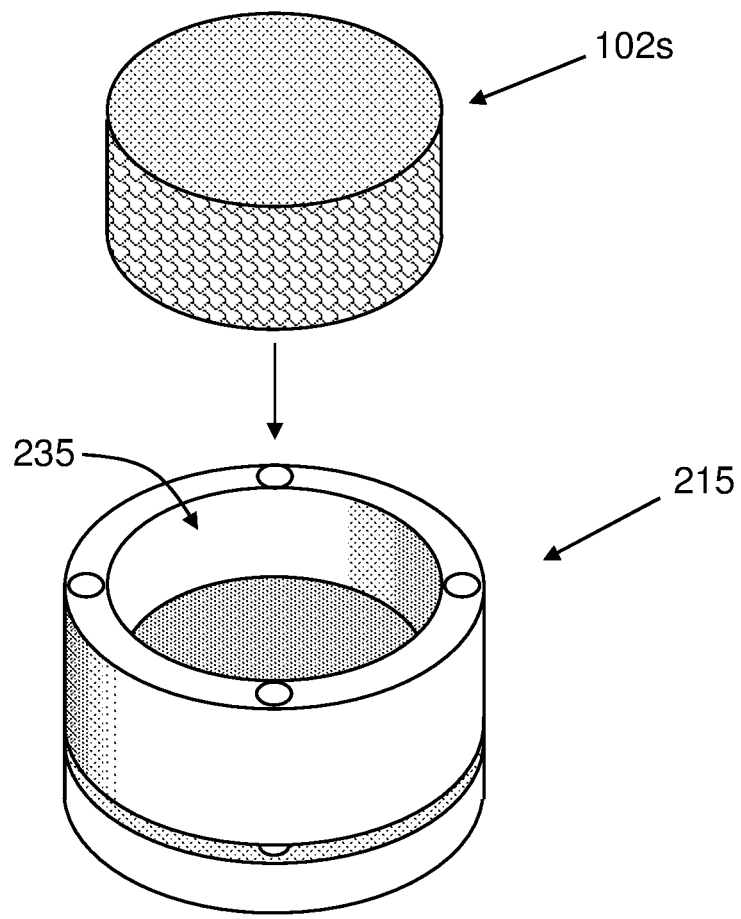
FIG. 5C is a schematic depiction of an adaptation of the sample holder of FIG. 4 for containing drill core slices as may be utilized in an X-ray analysis apparatus in accordance with the present teachings.

FIGS. 5A-5B are perspective views of sample holder accessories that may be attached to the sample holder 215 for the purpose of containing samples of various different physical configurations. Sample holder accessory 219a has a central well 231 that may be used for containment of a powdered sample. Sample holder 219b, which is commercially available from Polysius Corporation of Beckum, Germany, may be used for containment of a pressed pellet. The sample holder accessory 219b is in the general form of a ring that comprises male threading 233 along its outer perimeter that can mate with female threading within a hollow or recess of a sample holder. The pressed pellet may be accommodated within the central opening of the ring. FIG. 5C illustrates a method for containment of a core slice or sample 102s. The illustrated sample holder has a recess or hollow portion 235 that has an internal diameter that snugly restrains the core slice or sample.

EXAMPLE 1: COMBINED XRD AND XRF ANALYSES OF PRE-IDENTIFIED POINTS OF INTEREST

FIGS. 6A and 6B are schematic depictions of a surface of a sample undergoing analysis by both X-ray diffraction and X-ray fluorescence in accordance with the present teachings. For purposes of example, it is assumed that the surface is perfectly flat and that the sample is a core slice—that is, a cross sectional slice taken from a drill core and having a circular cross section having diameter, $d_{core}$. In practice, the sample may be any sample of interest that may be contained in the sample holder or in a suitable sample holder accessory device. For instance, the sample may be a loose powder, a pressed pellet or a solid block. Preferably, but not necessarily, the sample is circular or approximately circular in cross section. Preferably, the sample surface that is being analyzed is flat. Some sample preparation may be necessary, prior to analysis, in order to ensure that the sample surface is flat and to enable the sample to fit in an appropriate sample holder or sample holder accessory. The view in each of FIG. 6A and FIG. 6B is from directly above the sample surface that is undergoing analysis, under the assumption that it is a top surface of the core slice when mounted in the apparatus. For purposes of this example, it is assumed that, prior to XRD and XRF analysis, one or more features of interest on the sample surface have been identified as a result of some prior analysis or inspection. The prior analysis or inspection may be performed within a separate inspection apparatus that comprises a camera and a means to assign coordinates to features on the sample, wherein the assigned coordinates may later be referenced to coordinates that are specific to the XRD/XRF apparatus. Alternatively, the prior or analysis or inspection may be performed using an internal camera of the XRD/XRF apparatus.

In FIGS. 6A-6B, the point 213a represents the intersection of the rotation axis 213 with the sample surface. Note that the position of the core slice 102s relative to the X-ray sampled points 77a (square) and 77b (diamond), as depicted in FIGS. 6A-6B, assumes that the translation stage is configured such that the sample holder is disposed in a "neutral" position whereby the rotation axis piercing point 213a is disposed midway between the two sampled points 77a, 77b. Without movement of the translation stage from the neutral position, any pre-identified points of interest that lie on the circle 242 that contains the two sampled points 77a, 77b may be analyzed by both XRD and XRF by rotation of the rotation stage. In order to be able to sample more than just these points on circle 242 on the sample surface, the translation stage must be translated and the rotation stage must be rotated so that additional portions of the sample surface are exposed to the incident X-ray beams 201, 203. For ease of graphical presentation, the view of the core slice 102s, as depicted in FIGS. 6A and 6B, is taken within the translating reference frame of the sample holder and sample—that is, from the perspective of an observer above the sample who moves together with the translation stage, sample holder and sample as the translation stage is operated. From this viewpoint, a rightward movement of the sample holder in the laboratory reference frame appears as leftward movement of the points 77a, 77b along the sampling tracks 177a and 177b, respectively as indicated by the arrows on those tracks.

Let ΔY be the separation distance between the sampled points 77a, 77b. Then, it is obvious, through simple inspection of FIGS. 6A-6B, that every point of the sample surface within the annular region 241 may be moved onto one of the sampling tracks 177a, 177b by a combination of a translation of translation stage 226 and a rotation of rotation stage 215, wherein the maximum required range of motion of the translation stage is given by $D_t$ (see FIGS. 6A-6B), where $$D_t = \sqrt{\left(\frac{d_{core}}{2}\right)^2 - \left(\frac{\Delta Y}{2}\right)^2}$$

In contrast, the sample material within region 243, bounded by circle 242 of radius, ΔY/2, cannot be moved to a location at which it may be analyzed. However, in apparatus embodiments that include a second translation stage for which the direction of motion is orthogonal to the lines 177a, 177b, it is possible to analyze additional points within the region 243.

Because of instrumental constraints, the separation between the sampled points 77a, 77b generally cannot be closer than approximately 26 millimeters. Also, a typical core slice diameter is approximately 50 millimeters. Setting these quantities as the values for ΔY and $d_{core}$, respectively gives the result that the area of the annular region 241 is approximately seventy-three percent of the total surface area of the core slice 102s.

As an example, if it is of interest to obtain an X-ray diffractogram the sample material that is initially at location 11, which is at a radial distance, $r_p$, from the sample center, then, starting from the state in which the translation stage is in its neutral position, it is necessary to perform a translation, Δx, and a clockwise rotation, Δϑ$_1$, as shown in FIG. 6A. In this case, it may be shown that, $$\Delta x = \sqrt{r_p^2 - \left(\frac{\Delta Y}{2}\right)^2} \text{ and}$$

$$\Delta\vartheta_1 = \arcsin\left(\frac{\Delta x}{2}\right) + \arcsin\left(\frac{a}{r_p}\right)$$

where the distance, α, is defined as in FIG. 6A. These combined motions cause the sample material of interest to move from its initial location 11 to location 12 on sampling track 177a. At location 12, the sample material may be analyzed by XRD analysis. Simultaneously with the movement of sample material from location 11 to location 12, other sample material is caused to move from its initial position at location 13 to location 14 on sampling track 177b. At location 14, this material may be analyzed by XRF analysis. Note that the direction of rotational motion (i.e., clockwise or counterclockwise) and/or the direction of translational motion (i.e., rightward or leftward), as may be mentioned herein, is only for the purpose of explaining the examples.

It may be observed that, without further movement of the translation stage, any pre-identified points of interest that happen to lie on the circle 245 of radius, $r_p$, may be analyzed by both XRD and XRF. For instance, in order to subsequently perform XRF analysis on the sample material that was initially at location 11, it is only necessary to perform an additional clockwise sample rotation of Δϑ$_2$ (see FIG. 6B), thereby causing this sample material to move to location 14. The same rotation, Δϑ$_2$, causes other sample material to move from location 15 to location 12, where it is in position to be analyzed by XRD analysis. Thus, both XRD and XRF analysis may be performed at a plurality of defined locations on the sample surface, which may be brought into position for analysis by an appropriate translation and rotation of the sample by the moveable sample stage. Each sample location that is first sampled by one of the X-ray beams (XRD or XRF) may be subsequently sampled by the other beam, thereby providing complementary XRD and XRF information for each sampled location. Thus, structural and chemical information may be mapped across the sample. It follows from the fact that both XRD and XRF are detected simultaneously from different locations that the acquisition time for combined XRD and XRF data is optimized.

EXAMPLE 2: SAMPLE SURVEY BY A SERIES OF XRD AND XRF ANALYSES

Figure 6C:
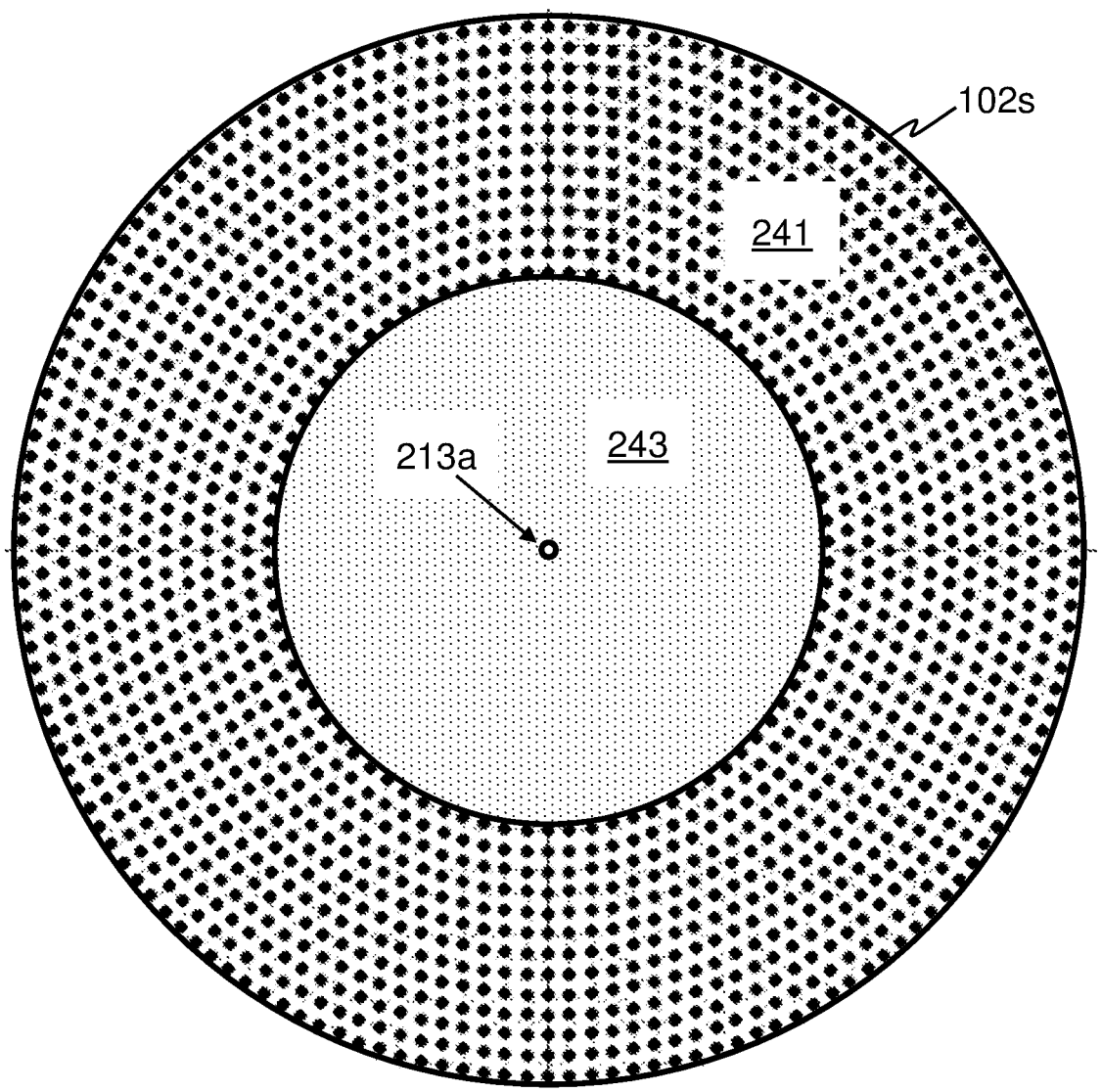
FIG. 6C is another schematic depiction of the sample surface of FIG. 6A, showing a grid of sample points determined using Eulerian mapping.

In many experimental situations, it may be desirable to perform a comprehensive survey comprising multiple analyses of a single sample or of a plurality of samples, instead of performing analyses of specific portions of samples as described in the prior example. In performing survey analyses, the goal is generally to assess an average chemical or mineralogical composition of a sample and/or to recognize trends in the variation of average compositions across several samples. FIG. 6C illustrates a sampling pattern in accordance with the present teachings that may be employed to perform a combined XRD and XRF survey of analyses of the surface of a core slice sample 102s. As in the prior example, it is assumed that the combined XRD and XRF data is acquired using an apparatus that employs the principles described above in reference to FIGS. 3A-3B, FIG. 4 and FIGS. 6A-6B.

As noted previously, analyses employing the above-described principles are only possible within the annular region 241 depicted in FIG. 6C. When using the moveable sample stage configuration illustrated in FIG. 4, analyses cannot be performed within the central circular region 243 that is centered on the rotational center 213a and that has a diameter essentially equivalent to the separation distance, ΔY, between the points at which the two incident X-ray beams 201, 203 intercept the sample surface. Nonetheless, under experimental situations that are both reasonable and favorable, the annular region 241 comprises approximately seventy-five percent of the sample surface.

Figure 6D:
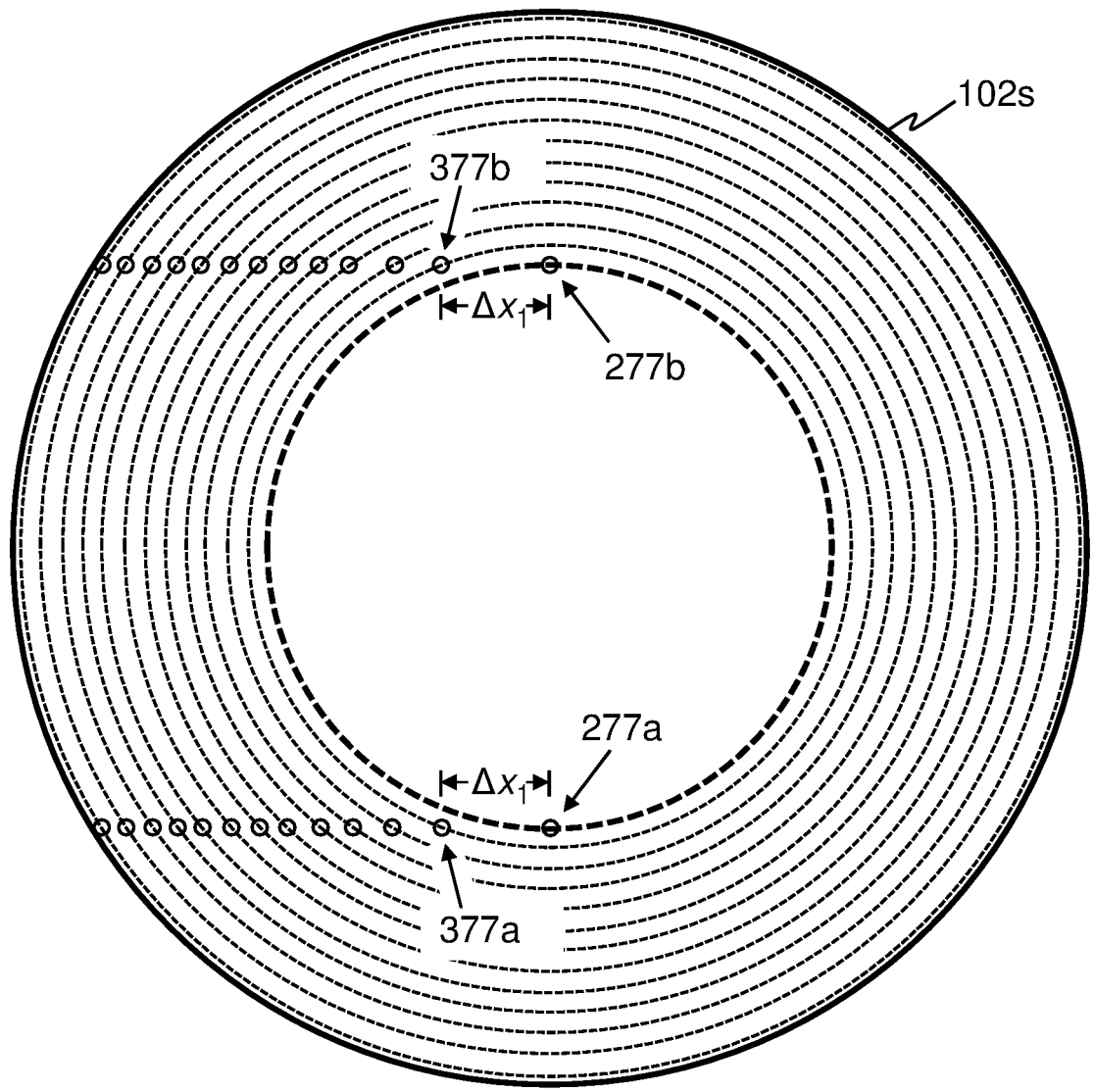
FIG. 6D is another schematic depiction of the sample surface of FIG. 6A, showing a series of circles at which two X-ray analyses may be conducted simultaneously, each circle corresponding to a single position of a translation stage on which the sample and a rotation stage are mounted and representing the loci of all points on the sample at which both X-ray diffraction and X-ray fluorescence data may be obtained, wherein selection of the points on the circle is performed by rotation of the rotation stage.

In performing a program of survey analyses of a sample in accordance with the present teachings, it is convenient to repetitively move the position of the translation stage 226 by a certain pre-determined distance and then, while the translation stage remains in one position, rotate the rotation stage 217 in a full circle in repetitive incremental steps comprising a constant angular increment. Alternatively, the XRD and XRF analyses may be performed using essentially continuous motion of the sample, as opposed to sampling of discrete points, in order to obtain a survey analysis or average analysis of the sample surface. Assuming that discrete points are analyzed, the numerous dots depicted within the region 241 in FIG. 6C represent a network of analysis points that may be analyzed according to such a program of movements of the translation and rotation stages. Each circular ring of dots in FIG. 6C represents a set of analyses along a curvilinear path that may be performed with the translation stage maintained in a single set position and each dot in any particular circular ring represents a single location that may be put into position for XRD and/or XRF analysis by an incremental angular rotation of the sample. FIG. 6D explicitly shows the positions of the circular rings in the absence of the dots.

For example, starting with the translation stage maintained in its neutral position, as defined above, a first pair of simultaneous analyses begins with X-ray diffraction analysis of the sample surface at location 277a (see FIG. 6D) and the simultaneous X-ray fluorescence analysis of the sample surface at location 277b. Subsequently, the rotation stage is rotated in eighty-three angular or rotational increments of 4.337 degrees in order to perform XRD and XRF analyses of the 82 locations indicated by the innermost circular ring of dots and to bring the rotation stage back to its initial orientation (i.e., by a full 360-degree rotation). Each incremental rotation of the sample moves a new pair of sample locations into the two X-ray beams 201, 203. In general, the length of the arc between the locations 277a, 277b of the two X-ray beams on the sample surface is an integer multiple of the curvilinear distance between consecutively or adjacently sampled locations on the sample, which is a function of the angular step. This ensures that the locations of analysis can be superimposed after a given amount of rotation. Once the rotation stage has returned to its initial orientation after the final (eighty-third) incremental rotation, the translation stage is moved rightward by a distance, $\Delta x_1$, (see FIG. 6D) to a second position such that points on the next circular ring of dots (that is adjacent the innermost ring) may be brought into position for analysis. An optional slight rotational adjustment may then be employed in order to bring two predetermined locations 377a, 377b on the sample surface into alignment with the two X-ray beams. Then, with the translation stage maintained in this second position, the rotation stage is rotated in eighty-nine increments of 4.091 degrees in order to perform XRD and XRF analyses of the 88 indicated sampling location on the second circular ring of dots and to once again bring the rotation stage back to its initial orientation. This procedure is then repeated for each of the eleven remaining circular rings of dots. The lines of small circles on FIG. 6D show the approximate sample-surface locations of analyses just after each movement of the translation stage and just before the next incremental rotation of the rotation stage. It may be observed that the distance by which the translation stage must be moved progressively decreases as the analyses move outwards towards the edge of sample 102s.

EXAMPLE 3: GENERAL METHODS IN ACCORDANCE WITH THE INVENTION

Figure 7:
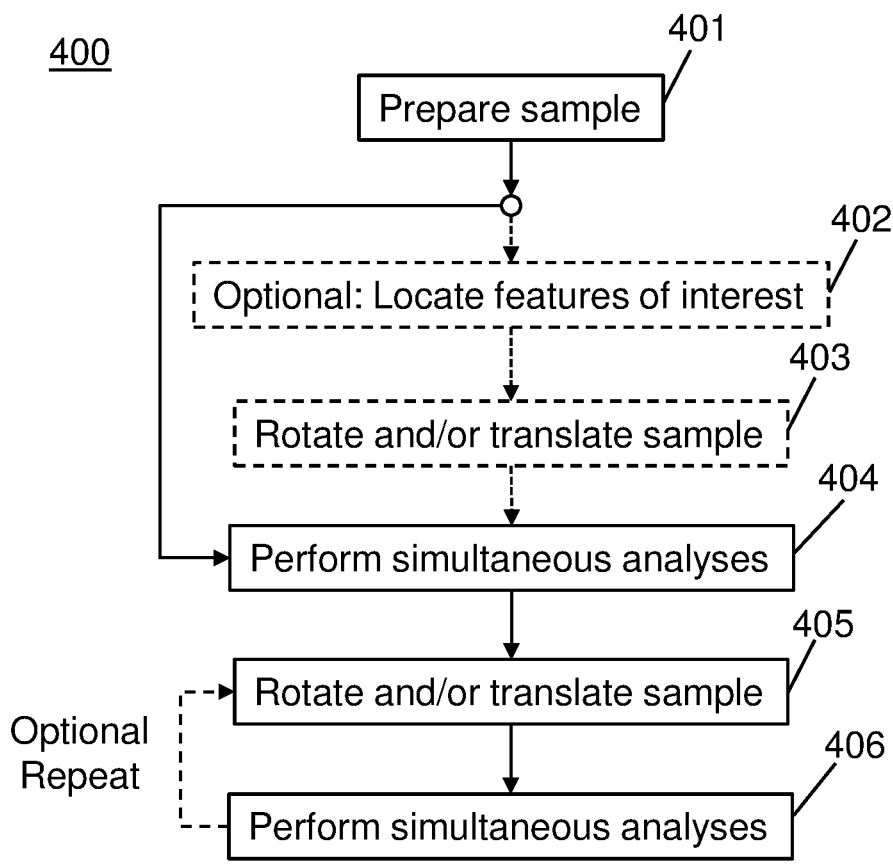
FIG. 7 is a schematic flow diagram of a method, in accordance with the present teachings, for combined X-ray diffraction and X-ray fluorescence of points on a sample surface.

FIG. 7 is a schematic flow diagram of a method 400, in accordance with the present teachings, for combined X-ray diffraction and X-ray fluorescence of points on a sample surface. The first step in the method 400 is a sample preparation step 401. The preparation step 401 may include one or more of the following procedures: choosing a sample for analysis from a collection of potential sample material; granulating or pulverizing an initially solid sample into a powder; compressing an initially powdered sample into a rigid pellet; embedding a whole sample or a collection of pieces of the sample within a supporting medium such as epoxy; fitting the sample into a suitable sample holder; planing, grinding or polishing one or more pieces of the sample that are to be analyzed so that a collection of surfaces of the sample that are to be analyzed are co-planar; and loading a sample holder having the sample into an apparatus capable of performing combined simultaneous analyses using different analytical techniques, such as the techniques of X-ray fluorescence (XRF) and X-ray diffraction (XRD).

The choosing of the sample may be performed based on visual inspection of a collection of potential sample material or, alternatively, based on prior analyses of the chemical, physical, or mineralogical makeup of the collection of potential sample material. As a further alternative, if the potential sample material is provided continuously or semi-continuously, such as from core extraction associated with a geological drilling procedure, samples for analysis may be automatically and periodically pulled from the flux of material, either in a timewise fashion or based on the amount of provided material. The choice of sample holder may be made based on the physical constitution of the sample material to be analyzed, with a first sample holder configuration being employed for powdered sample material, a second sample holder configuration being employed for pellets or samples embedded in a supporting medium and a third sample holder configuration being employed for intact samples, such as core slices.

Subsequent to the sample preparation step 401, the execution of the method 400 may proceed to the analysis step 404. Optionally, however, intervening additional steps 402 and 403 may be executed prior to the execution of step 404. The optional steps are outlined with dashed lined in FIG. 7. Optional step 402 comprises locating one or more features of interest on the surface of the sample or sample pieces and making a map of features of the sample or sample pieces such that each feature of interest is mapped to specific coordinates. The map may be constructed using any suitable coordinate system, such as a Cartesian coordinate system, a polar coordinate system, or, as discussed further below, an Eulerian coordinate system. In some instances, the features of interest may be chosen based on visual inspection of the sample, either using white-light illumination or else fluorescence-inducing monochromatic or ultraviolet illumination. In some other instances, the features of interest may be chosen based on prior analysis of the sample by a spectroscopic technique, such as Raman spectroscopy or hyperspectral imaging. In some instances, the choosing of features of interest may be performed after the sample has been loaded into the analysis apparatus, if the apparatus includes an internal camera or otherwise provides a line of sight into the apparatus through which the sample may be observed.

Optional step 403 comprises loading the sample into the analysis apparatus and, if necessary, adjusting the orientation of the sample in its holder within the apparatus. Such adjustment may be necessary in order to relate previously-determined sample-map coordinates to apparatus-specific coordinates. Preferably but not necessarily, the sample-map coordinates are referenced to an Eulerian coordinate system. The Eulerian coordinates of any location on a sample surface are, specifically, the translation distance and the rotation angle of the translation and rotation stages, respectively, that are required to bring that sample location into position for analysis, provided that the initial adjustment brings the sample into a standard reference position and a standard reference orientation.

Frequently, an initial adjustment performed in step 403 will comprise simply rotating the sample holder so that a fiducial mark on the holder aligns with a fiducial mark within the apparatus. Alternatively or additionally, the adjustment may include a lateral adjustment of a translation stage of the apparatus. The adjustment may also include adjusting the height of the sample surface, relative to fixed-position X-ray sources and X-ray detectors of the apparatus. Still further, step 403 may include, after loading the sample and performing the initial adjustment, rotation of a rotation stage of the apparatus (e.g., rotation stage 217) and translation of a translation stage of the apparatus (e.g., translation stage 226) such that a first feature of interest is positioned within a photon beam generated by a source of photons, such as an X-ray source, of the apparatus. Although the rotation and translation required to bring the feature(s) of interest into position may be performed manually, under visual inspection, it is preferable that these manipulations are performed automatically, under software control that references a previously-determined sample map.

Step 404 of the method 400 comprises loading the sample into an analysis apparatus that is capable of analyzing the sample by a combination of disparate analytical techniques that are performed simultaneously (if the sample loading has not already been done in step 403) and analyzing a first sample location that is illuminated by a first photon beam by a first analytical technique and, simultaneously with the analysis of the first sample location, analyzing a second sample location that is illuminated by a second photon beam by a second analytical technique. For example, the first and second analytical techniques may be X-ray diffraction analysis and X-ray fluorescence analysis. In such instances the photon beams are both X-ray beams. If step 403 has been previously executed, then at least one of the first and second analyses may be of a pre-identified feature of interest. Otherwise, if the first and second analyses are part of a general survey, then the initial locations of the analyses, such as the locations 277a-277b depicted in FIG. 6B, will simply be part of a pre-determined standard survey analysis pattern.

Step 405 of the method 400 comprises rotating a rotation stage (e.g., rotation stage 217) and/or translating a translation stage (e.g., translation stage 226) of the analysis apparatus so that two new sample locations are simultaneously brought into respective positions that are illuminated the photon beams. If optional step 402 has been executed, then the rotation and/or translation brings at least one pre-identified feature of interest into position for analysis. Otherwise, if the first and second analyses are part of a general survey, then the sample locations that are brought into position for analysis will simply be part of a pre-determined standard survey analysis pattern. The simultaneous analyses of the two locations are then performed in the following step 406. Subsequently, the steps 405 and 406 may be repeated a plurality of times, each repetition of these steps relating to different locations on the sample surface. The repetitions of steps 405 and 406 continue until either all features of interest have been analyzed or until the end of the pre-determined standard survey analysis pattern has been reached.

Figure 8:
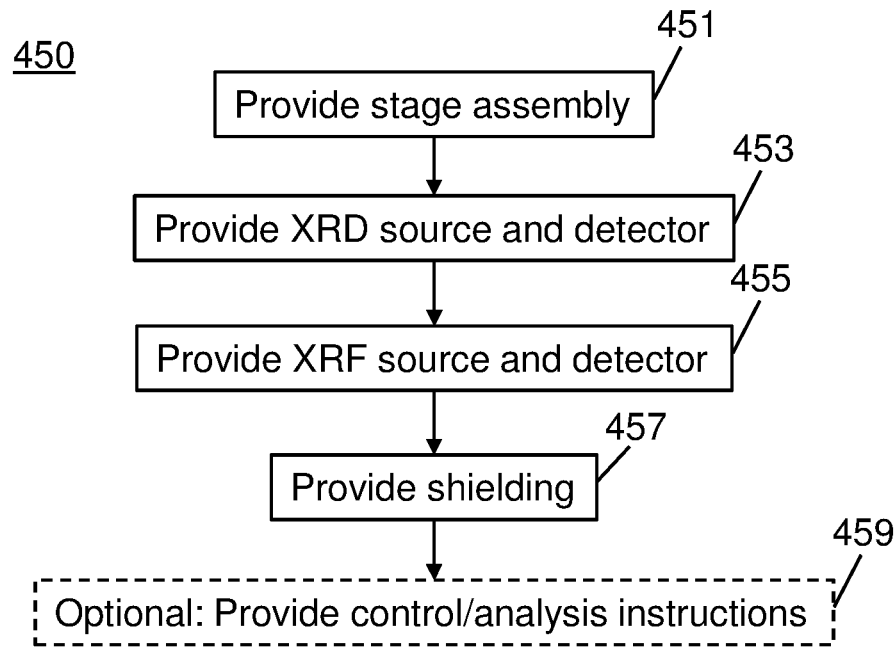
FIG. 8 is a schematic flow diagram of a method, in accordance with the present teachings, for manufacturing an apparatus for performing combined X-ray diffraction and X-ray fluorescence analyses.

FIG. 8 is a schematic flow diagram of a method 450, in accordance with the present teachings, for manufacturing an apparatus for performing combined X-ray diffraction and X-ray fluorescence analyses. Step 451 of the method 450 comprises providing a moveable stage assembly comprising a translation stage assembly comprising a platform that, in some embodiments, is moveable along a single substantially horizontal axis and further providing a rotation stage assembly that is adapted so as to be mounted on a top surface of the translation stage assembly. Optionally, the translation stage assembly may itself be mounted on top of a second translation stage assembly that is capable of translational movement that is essentially orthogonal to the direction by which the upper translation stage assembly is capable of moving. Step 451 also comprises providing a sample holder that is adapted to be mounted on the rotation assembly such that operation of the rotation stage assembly causes the sample holder to rotate about a substantially vertical rotation axis.

Step 453 of the method 450 comprises providing a first X-ray source and an X-ray detector array, whereby the first X-ray source is configured to emit a first X-ray beam that is configured to intercept the surface of a sample that is mounted on or within the sample holder at a first location on the sample and whereby the X-ray detector array is configured to detect diffracted X-rays that are emitted from the first location. The step 453 may also comprise providing a first X-ray collimator disposed between the first X-ray source and the sample.

Step 455 of the method 450 comprises providing a second X-ray source and an X-ray fluorescence detector, whereby the second X-ray source is configured to emit a second X-ray beam that is configured to intercept the surface of the sample that is mounted on or within the sample holder at a second location on the sample, the second location being spaced apart from the first location, and whereby the X-ray fluorescence detector is configured to detect X-ray fluorescence that is emitted from the second location. The step 455 may also comprise providing a second X-ray collimator disposed between the second X-ray source and the sample.

Step 457 of the method 450 comprises providing X-ray shielding that may be disposed such that the X-ray fluorescence detector is prevented from receiving either X-rays emitted from the first X-ray source or X-rays that are emitted from the first location and such that the X-ray detector array is prevented from receiving either X-rays emitted from the second X-ray source or X-rays that are emitted from the second location.

Finally, the method 450 may comprise an optional step 459 (outlined with a dashed line in FIG. 8) of providing computer-readable control instructions for operating an apparatus for performing combined X-ray diffraction and X-ray fluorescence analyses, wherein the apparatus comprises: a stage assembly comprising a translation stage and a rotation stage mounted onto a top surface of a platform of the translation stage; a sample holder mounted on the rotation stage and having a sample thereon or therein; a first X-ray source configured to illuminate a first location on the sample surface with a first X-ray beam; a second X-ray source configured to illuminate a second location on the sample surface—spaced apart from the first location—with a second X-ray beam; a detector array configured to detect diffracted X-rays emitted from the first location; and an X-ray fluorescence detector configured to detect X-ray fluorescence emitted from the second location. Preferably, the computer-readable control instructions are operable to cause a computer or electronic logic controller to control the operation of the first and second X-ray sources such that the first location on the sample surface is illuminated by the first X-ray beam and such that the second location on the sample surface is illuminated by the second X-ray beam, and are also operable to simultaneously collect and store data generated by the detector array and by the X-ray fluorescence detector. Preferably, the computer-readable control instructions are further operable to cause the computer or electronic logic controller to control the operation of the translation stage and the rotation stage such that the operation of these two stages causes a third location on the sample surface to be illuminated by the first X-ray beam and causes a fourth location on the sample surface to be illuminated by the second X-ray beam.

Preferably, the computer-readable instructions that are optionally provided in step 459 of the method 450 are further operable to cause the computer or electronic logic controller to receive and read user-provided position coordinates of a feature of interest on the sample surface and to subsequently control the operation of the translation and rotation stages such that the feature of interest is brought into position to be illuminated by the first X-ray beam. Preferably, the computer-readable instructions are further operable to cause the computer or electronic logic controller to further control the operation of the rotation stage such that the feature of interest is also brought into position to be illuminated by the second X-ray beam.

Preferably, the computer-readable instructions that are optionally provided in step 459 of the method 450 are operable to cause the computer or electronic logic controller to control the operation of the translation and rotation stages such that a plurality of pairs of locations are brought into illumination by the first X-ray beam and the second X-ray beam, wherein the pairs are sequentially brought into position such that a first member of each pair of locations is brought into illumination by the first X-ray beam and a second member of each pair of locations is simultaneously brought into illumination by the second X-ray beam. Preferably, the computer-readable instructions are further operable such that the pairs are sequentially brought into position as described above in accordance with a pre-defined survey pattern.

The computer-readable control instructions, as described above, for operating an apparatus for performing combined X-ray diffraction and X-ray fluorescence analyses may be provided, either in whole or in part, as a separate software product.

The discussion included in this application is intended to serve as a basic description. Although the present invention has been described in accordance with the various embodiments shown and described, one of ordinary skill in the art should be aware that the specific discussion may not explicitly describe all embodiments possible; many alternative modifications are implicit.

What is claimed is:
1. An analysis apparatus, comprising:
a moveable stage assembly;
a sample holder that is adapted to be mounted on a top surface of the moveable stage assembly;
a first X-ray source and a first X-ray detector or detector array, wherein the first X-ray source is configured to emit a first X-ray beam that is configured to intercept the surface of a sample that is mounted on or within the sample holder at a first location on the sample and wherein the first X-ray detector or detector array is configured to detect X-rays that are emitted from the first location; and
a second X-ray source and a second X-ray detector or detector array, wherein the second X-ray source is configured to emit a second X-ray beam that is configured to intercept the surface of the sample that is mounted on or within the sample holder at a second location on the sample simultaneously with the first X-ray beam intercepting the surface of the sample at the first location, the second location being spaced apart from the first location, and wherein the second X-ray detector or detector array is configured to detect X-rays that are emitted from the second location simultaneously with the first X-ray detector or detector array detecting photons that are emitted from the first location.

2. An analysis apparatus as recited in claim 1, wherein the moveable stage assembly comprises:
a first translation stage assembly comprising a first platform that is moveable along a first substantially horizontal axis.

3. An analysis apparatus as recited in claim 1, wherein the moveable stage assembly further comprises:
a rotation stage assembly having the top surface of the moveable stage assembly.

4. An analysis apparatus as recited in claim 3, wherein the first and second locations on the sample lie on a common arc and the rotation stage assembly is configured to rotate the sample about a vertical axis such that the first and second locations on the sample move along the common arc.

5. An analysis apparatus as recited in 3, further comprising:
a computer or electronic logic controller electronically coupled to the moveable stage assembly and comprising computer readable instructions that are operable to cause the computer or electronic logic controller to cause the moveable stage assembly to translate the sample parallel to the first substantially horizontal axis and/or cause the rotation stage assembly to rotate the sample orientation about the substantially vertical rotation axis such that a feature of interest on the sample surface is illuminated by one of the first and second X-ray beams.

6. An analysis apparatus as recited in claim 5, wherein the computer readable instructions are further operable to cause the computer or electronic logic controller to cause the rotation stage assembly to rotate or further rotate the sample orientation about the substantially vertical rotation axis such that the feature of interest is illuminated by the other one of the first and second X-ray beams.

7. An analysis apparatus as recited in claim 5, wherein the translation and/or rotation of the sample are referenced to an Eulerian map of the sample surface.

8. An analysis apparatus as recited claim 3, further comprising:
a computer or electronic logic controller electronically coupled to the moveable stage assembly and comprising computer readable instructions that are operable to cause the computer or electronic logic controller to cause the moveable stage assembly to repeatedly translate the sample parallel to the first substantially horizontal axis and/or cause the rotation stage assembly to repeatedly rotate the sample orientation about the substantially vertical rotation axis such that a plurality of locations on the sample surface are successively illuminated by one or both of the first and second X-ray beams, wherein the plurality of locations comprise an array of locations that are evenly distributed throughout a portion of the sample surface.

9. An analysis apparatus as recited in claim 2, further comprising a second translation stage assembly mounted on the platform of the first translation stage assembly and comprising a second platform that is moveable along a second substantially horizontal axis that is substantially perpendicular to the first substantially horizontal axis.

10. An analysis apparatus as recited in claim 1, wherein:
the first X-ray detector or detector array is configured to detect X-rays that are diffracted by the sample at the first location; and
the second X-ray detector or detector array is configured to detect X-ray fluorescent emissions from the second location.

11. An analysis apparatus as recited in claim 10, wherein:
the first X-ray detector or detector array comprises either a detector that is moveable along an arc or an array of detectors that are disposed along an arc; and
the second X-ray detector or detector array comprises an energy-dispersive X-ray fluorescence detector or a wavelength dispersive X-ray fluorescence detector.

12. An analysis apparatus as recited in claim 10, wherein:
the first X-ray beam and the first X-ray detector or detector array define a first plane; and
the second X-ray beam and the second X-ray detector or detector array define a second plane,
wherein the first and second planes are substantially parallel to one another.

13. An analysis apparatus as recited in claim 12, further comprising at least one shielding device configured such that the second X-ray detector or detector array is prevented from receiving either X-rays emitted from the first X-ray source or X-rays that are emitted from the first location and/or such that the first X-ray detector or detector array is prevented from receiving either X-rays emitted from the second X-ray source or X-rays that are emitted from the second location.

14. An analysis apparatus as recited in claim 10, further comprising:
a computer or electronic logic controller electronically coupled to the moveable stage assembly and comprising computer readable instructions that are operable to cause the computer or electronic logic controller to cause the moveable stage assembly to translate the sample such that a feature of interest on the sample surface is illuminated by one of the first and second X-ray beams.

15. An analysis apparatus as recited in 14, wherein the computer readable instructions are further operable to cause the computer or electronic logic controller to cause the moveable stage assembly to again translate the sample such that the feature of interest is illuminated by the other one of the first and second X-ray beams.

16. An analysis apparatus as recited in claim 10, further comprising an analysis probe configured to acquire spectroscopic data from a third location on the sample surface, wherein the acquisition of the spectroscopic data does not require X-ray illumination of the third location.

17. An analysis apparatus as recited in claim 16, wherein the analysis probe comprises a camera.

18. An analysis apparatus as recited in claim 16, wherein the spectroscopic data that is acquired by the analysis probe is acquired by Raman spectroscopy, UV-visible reflection or fluorescence spectroscopy, infrared reflectance spectroscopy, diffuse reflectance infrared Fourier transform spectroscopy, or laser-induced breakdown spectroscopy.

19. A method for performing analyses of multiple locations on a sample surface, comprising:
(a) mounting a sample holder having a prepared sample therein or thereon onto a moveable stage assembly or loading the prepared sample onto or into a sample holder on the moveable stage assembly of an analysis apparatus that comprises:
a first X-ray source and a first X-ray detector or detector array, wherein the first X-ray source is configured to emit a first X-ray beam that is configured to intercept the surface of the prepared sample that is mounted on or within the sample holder at a first sample location and wherein the first X-ray detector or detector array is configured to detect X-rays that are emitted from the first sample location; and
a second X-ray source and a second X-ray detector or detector array, wherein the second X-ray source is configured to emit a second X-ray beam that is configured to intercept the surface of the prepared sample that is mounted on or within the sample holder at a second sample location, the second sample location being spaced apart from the first sample location, and wherein the second X-ray detector or detector array is configured to detect X-rays that are emitted from the second sample location;
(b) acquiring first data relating to X-rays emitted from the first sample location and detected by the first X-ray detector or detector array and simultaneously acquiring second data relating to X-rays emitted from the second sample location and detected by the second photon detector or detector array;
(c) operating the moveable stage assembly such that the first X-ray beam intercepts the surface of the prepared sample at a third sample location; and
(d) acquiring third data relating to X-rays emitted from the third sample location and detected by the first X-ray detector or detector array.

* * * * *

UNITED STATES PATENT AND TRADEMARK OFFICE
CERTIFICATE OF CORRECTION

PATENT NO. : 11,796,492 B2
APPLICATION NO. : 17/550440
DATED : October 24, 2023
INVENTOR(S) : Henry Pilliere It is certified that error appears in the above-identified patent and that said Letters Patent is hereby corrected as shown below:

In the Claims

In Column 28, Claim 5, Line 15, delete "recited in 3," and insert -- recited in claim 3, --, therefor.

In Column 28, Claim 8, Line 39, delete "recited" and insert -- recited in --, therefor.

In Column 29, Claim 15, Line 34, delete "recited in 14," and insert -- recited in claim 14, --, therefor.

Signed and Sealed this
Twenty-eighth Day of November, 2023

Katherine Kelly Vidal
*Director of the United States Patent and Trademark Office*